US009104361B2

(12) United States Patent
Okuno

(10) Patent No.: US 9,104,361 B2
(45) Date of Patent: Aug. 11, 2015

(54) COMPUTER PROGRAM AND DATA PROCESSING APPARATUS FOR CONTROLLING AND DISPLAYING A STATUS OF AN IMAGE PROCESSING APPARATUS

(71) Applicant: BROTHER KOGYO KABUSHIKI KAISHA, Nagoya-shi, Aichi-ken (JP)

(72) Inventor: Tetsuya Okuno, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/306,884

(22) Filed: Jun. 17, 2014

(65) Prior Publication Data

US 2015/0002890 A1    Jan. 1, 2015

(30) Foreign Application Priority Data

Jun. 28, 2013 (JP) ................................. 2013-137465

(51) Int. Cl.
*G06F 3/12* (2006.01)

(52) U.S. Cl.
CPC ............ *G06F 3/1294* (2013.01); *G06F 3/1205* (2013.01); *G06F 3/1259* (2013.01); *G06F 3/1286* (2013.01)

(58) Field of Classification Search
CPC ... G06F 3/1294; G06F 3/1205; G06F 3/1286; G06F 3/1259
USPC ......................................... 358/1.1, 1.13, 1.15
See application file for complete search history.

(56) References Cited

U.S. PATENT DOCUMENTS

| 6,151,464 | A | * | 11/2000 | Nakamura et al. | ............... 399/79 |
| 7,139,085 | B1 | * | 11/2006 | Sakaguchi | .................. 358/1.15 |
| 7,298,508 | B2 | * | 11/2007 | Furukawa et al. | ............ 358/1.15 |
| 8,037,521 | B2 | * | 10/2011 | Minato | ........................... 726/16 |
| 8,621,467 | B2 | * | 12/2013 | Takahashi et al. | ............ 718/102 |
| 2002/0036793 | A1 | * | 3/2002 | Roosen et al. | ............... 358/1.15 |
| 2003/0103235 | A1 | * | 6/2003 | Gomi | ........................... 358/1.15 |
| 2004/0017580 | A1 | * | 1/2004 | Kuroda | ........................ 358/1.13 |
| 2004/0184080 | A1 | * | 9/2004 | Gotoh et al. | .................. 358/1.15 |
| 2005/0008417 | A1 | * | 1/2005 | Nomura et al. | ................. 400/62 |
| 2005/0055641 | A1 |  | 3/2005 | Machida |  |

(Continued)

FOREIGN PATENT DOCUMENTS

JP    2000-315182 A    11/2000
JP    2009-016969 A    1/2009

*Primary Examiner* — Benny Q Tieu
*Assistant Examiner* — Quyen V Ngo
(74) *Attorney, Agent, or Firm* — Merchant & Gould PC

(57) ABSTRACT

A non-transitory computer-readable medium having instructions to control a processor to execute: acquiring status information related to a status of at least one image processing apparatus; and displaying a status image, which is an image representing the status of the image processing apparatus associated with the acquired status information, wherein an executing combination status is a status where at least one apparatus of the one set of the image processing apparatuses is executing the partial image processing of the specific image processing, wherein a requested combination status is a status where a communication for the specific image processing has been requested and all the image processing apparatuses of the one set have not yet started, and wherein the displaying displays an executing image representing the executing combination status, the executing image being displayed in a distinguishable form from a requested image representing the requested combination status.

10 Claims, 19 Drawing Sheets

OWN APPARATUS IS CONNECTED

OWN APPARATUS IS RESERVED

(56) References Cited

U.S. PATENT DOCUMENTS

| | | |
|---|---|---|
| 2005/0157335 A1* | 7/2005 | Kuga et al. .................. 358/1.15 |
| 2005/0265066 A1* | 12/2005 | Machiyama .................. 365/145 |
| 2006/0279775 A1* | 12/2006 | Matsumoto et al. ......... 358/1.15 |
| 2008/0184162 A1* | 7/2008 | Lindsey et al. ............... 715/783 |
| 2009/0006554 A1 | 1/2009 | Fujishita |
| 2009/0059286 A1* | 3/2009 | Yamaguchi .................. 358/1.15 |
| 2009/0091783 A1* | 4/2009 | Kazume et al. .............. 358/1.15 |
| 2011/0063665 A1* | 3/2011 | Hirakawa et al. ........... 358/1.15 |
| 2013/0148155 A1* | 6/2013 | Kitagata ....................... 358/1.15 |

* cited by examiner

FIG. 2

| COMMUNICATION APPARATUS | FUNCTION | |
|---|---|---|
| FIRST SCANNER 200A | SCAN | ~134 |
| SECOND SCANNER 200B | SCAN | |
| FIRST PRINTER 300A | PRINTING | |
| SECOND PRINTER 300B | PRINTING | |
| FIRST PORTABLE TERMINAL 400A | CONTROL | |
| SECOND PORTABLE TERMINAL 400B | CONTROL | |
| PROJECTOR 500 | DISPLAY | |
| ⋮ | ⋮ | |

FIG. 3

| | FIRST PORTABLE TERMINAL 400A | SECOND PORTABLE TERMINAL 400B | ... |
|---|---|---|---|
| FIRST SCANNER 200A | C4 | C1 | ... |
| SECOND SCANNER 200B | C1 | C1 | ... |
| FIRST PRINTER 300A | C3 | C1 | ... |
| SECOND PRINTER 300B | C1 | C1 | ... |
| PROJECTOR 500 | C1 | C1 | ... |
| ... | ... | ... | ... |

136

C1: RELEASED, C2: CONNECTED, C3: RESERVED, C4: BEING USED, C5: BE OVER

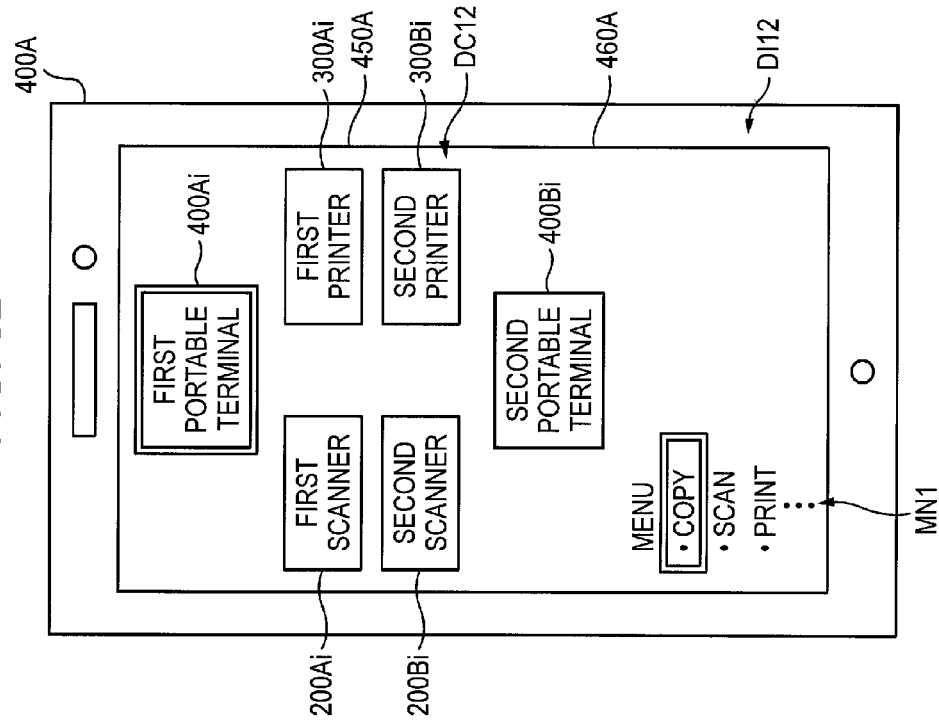
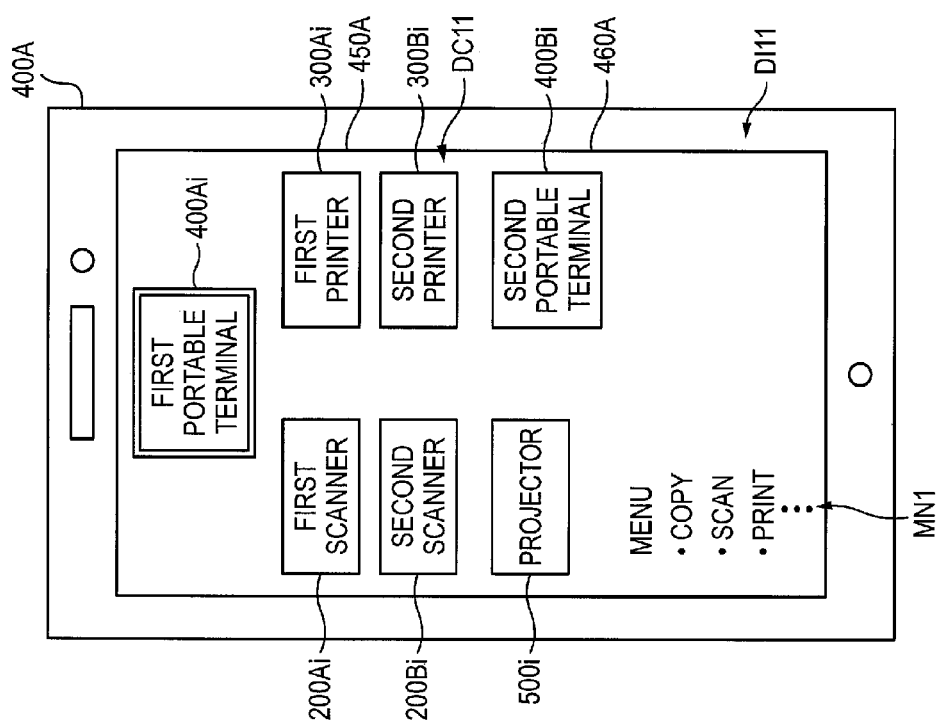

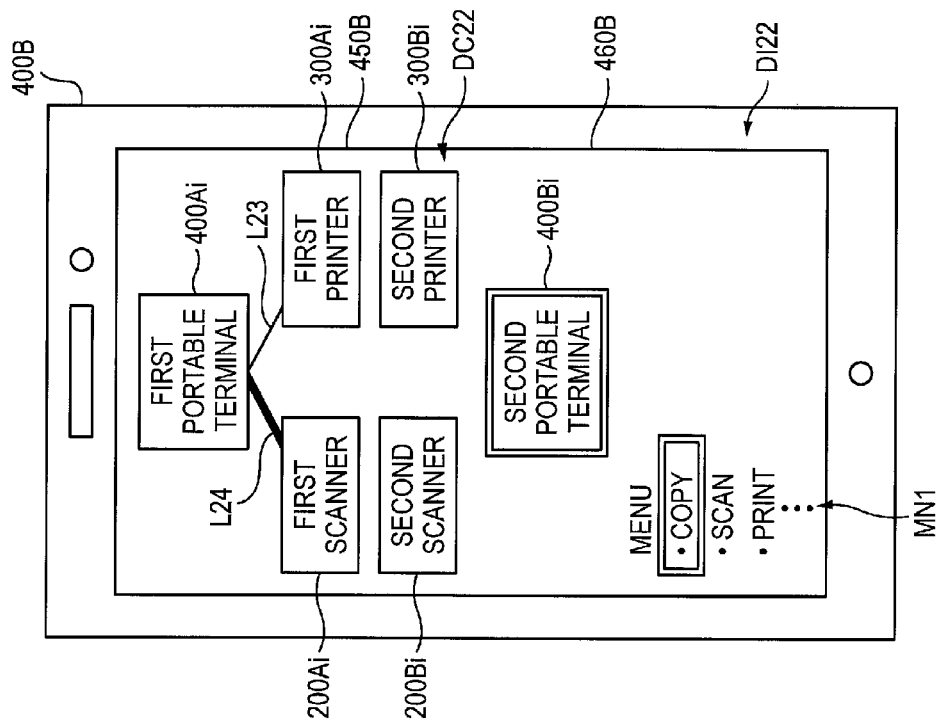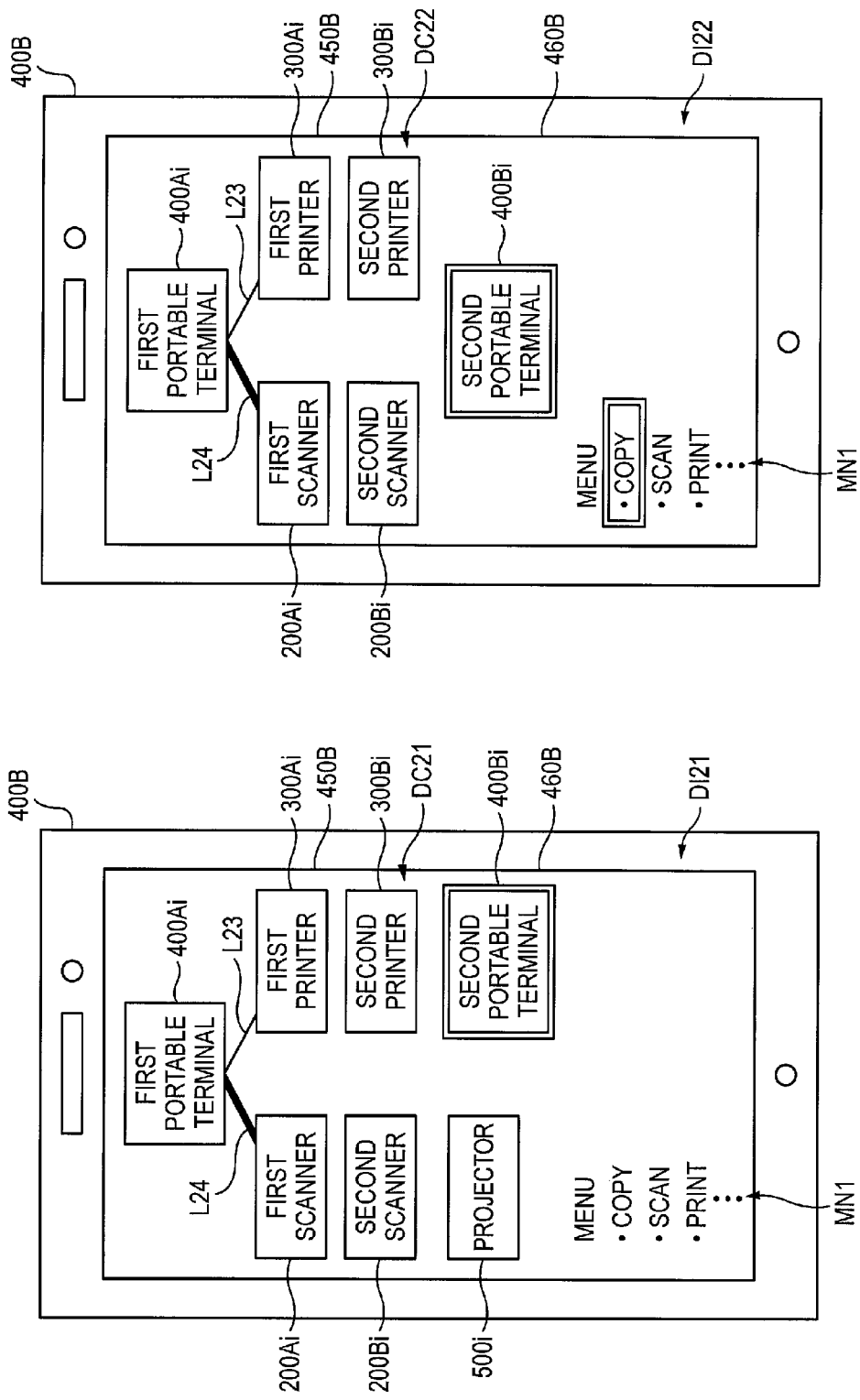

OWN APPARATUS
IS CONNECTED

OWN APPARATUS
IS RESERVED

OWN APPARATUS
IS BEING USED

OTHER APPARATUS
IS CONNECTED

OTHER APPARATUS
IS RESERVED

OTHER APPARATUS
IS BEING USED

PROCESSING
SEQUENCE

PROCESSING
IS COMPLETED

OWN APPARATUS IS CONNECTED

OWN APPARATUS IS RESERVED

OWN APPARATUS IS BEING USED

OTHER APPARATUS IS CONNECTED

OTHER APPARATUS IS RESERVED

OTHER APPARATUS IS BEING USED

DATA IS BEING TRANSMITTED

TEMPORARILY UNAVAILABLE

TEMPORARILY UNAVAILABLE

TEMPORARILY UNAVAILABLE (ACTION IS REQUIRED)

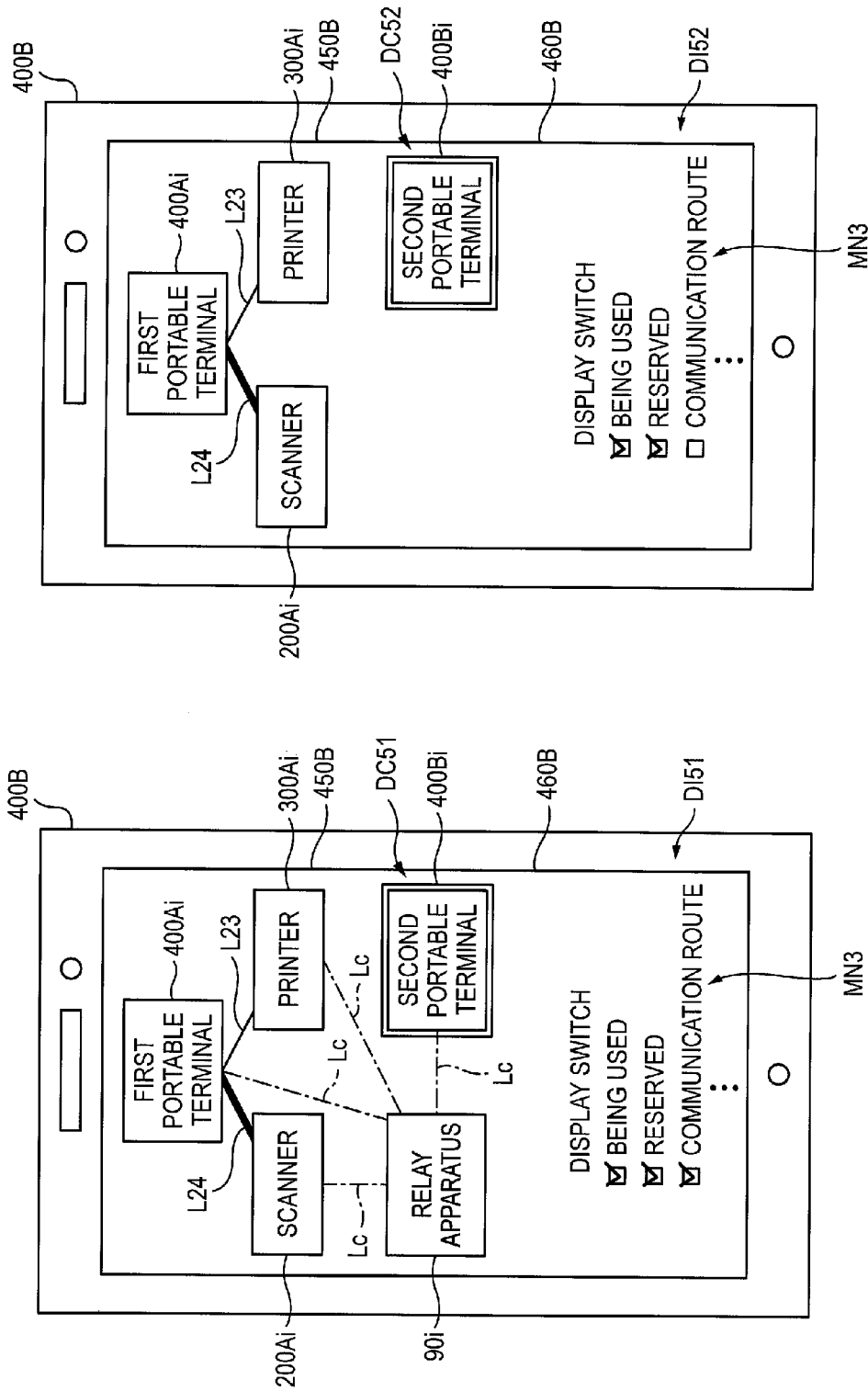

COMPUTER PROGRAM AND DATA PROCESSING APPARATUS FOR CONTROLLING AND DISPLAYING A STATUS OF AN IMAGE PROCESSING APPARATUS

CROSS-REFERENCE TO RELATED APPLICATION

This application claims priority from Japanese Patent Application No. 2013-137465 filed on Jun. 28, 2013, the entire subject matter of which is incorporated herein by reference.

TECHNICAL FIELD

This disclosure relates to a technology of using a plurality of image processing apparatuses connected to a network.

BACKGROUND

A variety of image processing apparatuses (for example, a scanner and a printer) have been used with being connected to a network. Also, a technology of using a combination of a plurality of image processing apparatuses connected to a network has been proposed. For example, a following system has been proposed. That is, a scanner, a printer and a client are connected to a network. A CRT of the client displays a network connection configuration. When a user drags and drops a scanner icon on a printer icon, the CRT of the client displays a copy function setting screen.

SUMMARY

When using a combination of the plurality of image processing apparatuses on the network, it is not easy to perceive statuses of a combination of the image processing apparatuses. For example, when copying a document by using the scanner and the printer, it is not easy to perceive whether the scanner and the printer have actually started processing for the copy.

A merit of this disclosure provide at least a technology of easily perceiving a status of at least one image processing apparatus of one combination of image processing apparatuses of a plurality of image processing apparatuses.

This disclosure has been made to solve at least a part of the above-described problems and can be implemented by following Examples.

Example 1

A non-transitory computer-readable medium has instructions, and the instruction according to one example of this disclosure controls a processor to execute: acquiring status information related to a status of at least one image processing apparatus, the at least one image processing apparatus being included in a plurality of image processing apparatuses connected to a network; and displaying a status image, which is an image representing the status of the image processing apparatus associated with the acquired status information, on a display device. A combination status is status being related to image processing apparatuses, each of which executes each of a plurality of partial image processing constituting specific image processing, of the plurality of image processing apparatuses, wherein in the combination status, an executing combination status is a status where at least one apparatus of the one set of the image processing apparatuses is executing the partial image processing of the specific image processing, wherein in the combination status, a requested combination status is a status where a communication for the specific image processing has been requested for at least one apparatus of the one set of the image processing apparatuses and all the image processing apparatuses of the one set have not yet started the partial image processing of the specific image processing. Then, the displaying displays an executing image representing the executing combination status, the executing image being displayed in a distinguishable form from a requested image representing the requested combination status.

According to the above configuration, it is possible to easily perceive a status of at least one image processing apparatus of one combination of image processing apparatuses of a plurality of image processing apparatuses.

Example 2

A non-transitory computer-readable medium has instructions, and the instruction according to another example of this disclosure controls a processor to execute: acquiring status information related to a status of at least one image processing apparatus, the at least one image processing apparatus being included in a plurality of image processing apparatuses connected to a network; and displaying a status image, which is an image representing the status of the image processing apparatus associated with the acquired status information, on a display device. A combination status is status being related to one set of image processing apparatuses, each of which executes each of a plurality of partial image processing constituting specific image processing, of the plurality of image processing apparatuses, and in the combination status, an executing combination status is a status where at least one apparatus of the one set of the image processing apparatuses is executing the partial image processing of the specific image processing. Then, the displaying displays the status image comprising, as the executing image, a post-start image representing the image processing apparatus that has started execution of the partial image processing of the specific image processing and a pre-start image representing the image processing apparatus having not yet started execution of the partial image processing of the specific image processing, the pre-start image being displayed in a distinguishable form from the post-start image.

According to the above configuration, it is possible to easily perceive that one set of the image processing apparatuses includes the image processing apparatuses being executing the partial image processing and the image processing apparatus having not yet started the partial image processing.

In the meantime, this disclosure can be implemented in a variety of aspects. For example, this disclosure can be implemented in aspects of a data processing method, a data processing apparatus, a computer program for implementing functions of the method or apparatus, a recording medium (for example, a non-temporary recording medium) having the computer program recorded therein, and the like.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2 is a schematic view illustrating function information;

FIG. 3 is a schematic view illustrating status information;

FIGS. 8A to 8D are schematic views illustrating an example of a display image;

FIGS. 9A to 9D are schematic views illustrating an example of the display image;

FIGS. 18A and 18B are schematic views illustrating another example of the status image.

DETAILED DESCRIPTION

A. First Illustrative Embodiment

Figure 1:
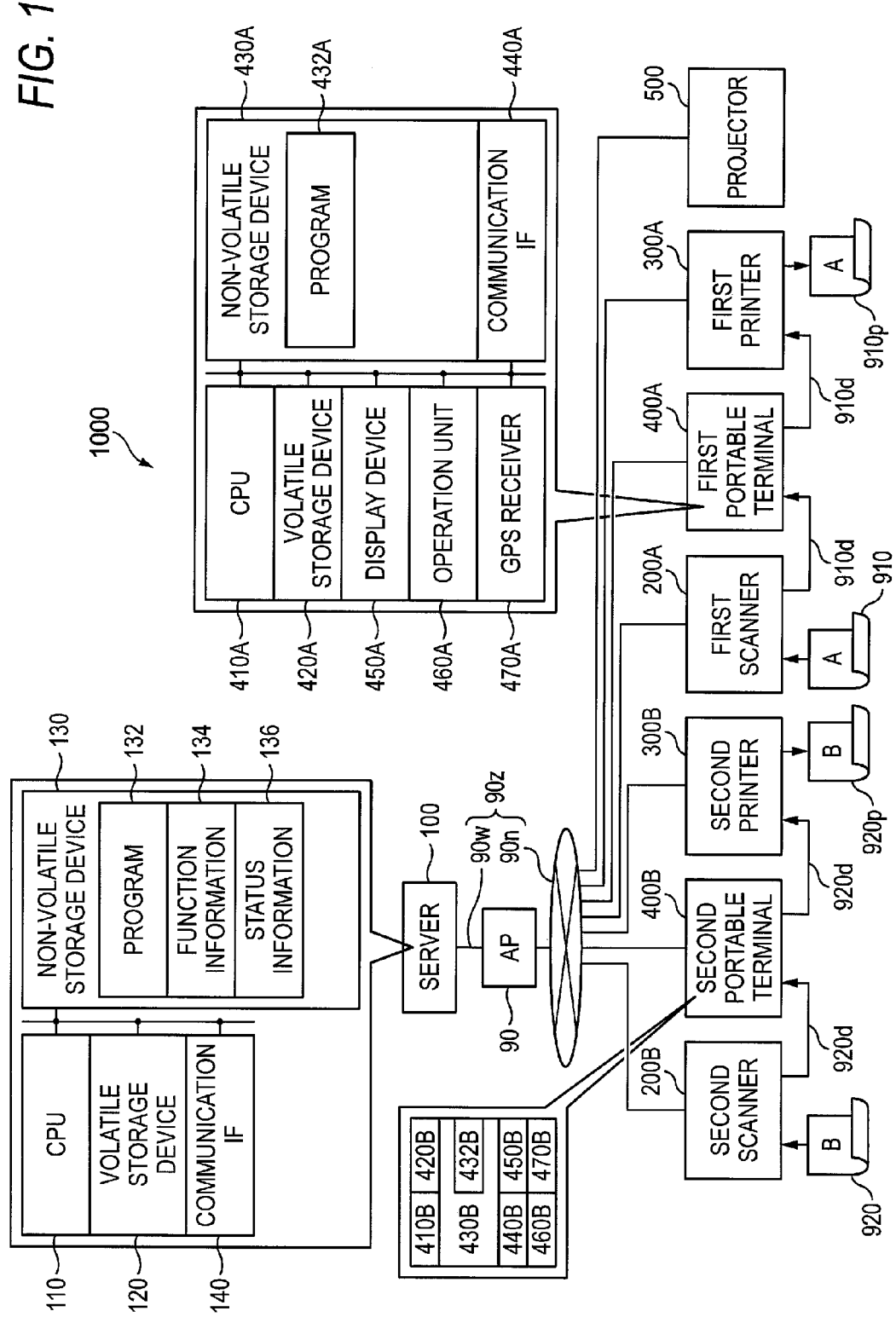
FIG. 1 illustrates an image processing system according to an illustrative embodiment of this disclosure.

FIG. 1 illustrates an image processing system according to an illustrative embodiment of this disclosure. The image processing system 1000 includes a server 100, a first scanner 200A, a second scanner 200B, a first printer 300A, a second printer 300B, a first portable terminal 400A, a second portable terminal 400B, a projector 500 and a wireless network access point 90. The access point 90 is a wireless network access point using a communication method that is defined by standards such as IEEE 802.11a/b/g/n and the like.

The server 100 is connected to the access point 90 via a wired network 90w. Also, all the apparatuses 200A, 200B, 300A, 300B, 400A, 400B, 500 can communicate with the other apparatuses including the server 100 via the access point 90. In other words, it can be said that the access point 90 forms a wireless network 90n and the apparatuses 200A, 200B, 300A, 300B, 400A, 400B, 500 are respectively connected to the wireless network 90n. Also, both the wired network 90w and the wireless network 90n can be considered as one network 90z that is formed by the access point 90.

The server 100 has a CPU 110, a volatile storage device 120, a non-volatile storage device 130 and a communication interface 140. The volatile storage device 120 is a so-called DRAM, for example, and the non-volatile storage device 130 is a so-called hard disk drive, for example. The non-volatile storage device 130 stores therein a program 132 that is executed by the CPU 110, function information 134 and status information 136 (which will be specifically described later). In the meantime, although not shown, the non-volatile storage device 130 stores a program for implementing an operating system of the server 100. The operating system has a function of controlling the hardware elements (for example, the communication interface 140) of the server 100. In this illustrative embodiment, the program 132 is an application that operates on the operating system. The CPU 110 temporarily stores a variety of intermediate data, which is used for execution of the program 132, in the storage device (for example, the volatile storage device 120 or non-volatile storage device 130). The communication interface 140 is an interface for performing wired communication and is connected to the wired network 90w.

The scanners 200A, 200B are apparatuses that generate image data (also referred to as 'scan data') displaying a target such as a document by optically reading the target. The printers 300A, 300B are apparatuses that print an image, which is displayed by the image data, on a printing medium by using the image data. The projector 500 is an apparatus that projects an image, which is displayed by the image data, on a screen (not shown) by using the image data. All the apparatuses 200A, 200B, 300A, 300B, 500 correspond to the image processing apparatus.

The portable terminals 400A, 400B are multifunctional portable terminals such as a so-called smart phone. In FIG. 1, a configuration of the first portable terminal 400A is shown. The first portable terminal 400A has a CPU 410A, a volatile storage device 420A, a non-volatile storage device 430A, a communication interface 440A, a display device 450A, an operation unit 460A, a GPS (Global Positioning System) receiver 470A.

The volatile storage device 420A is a so-called DRAM, for example, and the non-volatile storage device 430A is a so-called flash memory, for example. The non-volatile storage device 430A stores therein a program 432A that is executed by the CPU 410A. The CPU 410A executes the program 432A to thus carry out a variety of image processing. For example, the CPU 410A implements a copy operation by using the first scanner 200A and the first printer 300A. Specifically, the CPU 410A enables the first scanner 200A to optically scan a document 910 and acquires scan data 910d from the first scanner 200A. Then, the CPU 410A supplies the acquired scan data 910d to the first printer 300A and enables the first printer 300A to print an image that is represented by the scan data 910d. Thereby, a printed document 910p is generated. In the meantime, although not shown, the non-volatile storage device 430A stores therein a program for implementing an operation system of the first portable terminal 400A. The operating system has a function of controlling the hardware elements (for example, the display device 450A and the communication interface 440A) of the first portable terminal 400A. In this illustrative embodiment, the program 432A is an application that operates on the operating system. Also, the CPU 410A temporarily stores a variety of intermediate data, which is used for execution of the program (for example, the program 432A), in the storage device (for example, the volatile storage device 420A or non-volatile storage device 430A).

The communication interface 440A is an interface for performing wireless communication and can perform wireless communication with the access point 90. The display device 450A is an device that displays an image, and is a liquid crystal monitor, for example. The operation unit 460A is a device that receives a user operation, and is a touch panel that is arranged with being overlapped over the display device 450A, for example. The GPS receiver 470A receives a so-called GPS signal and generates digital data that displays a position from the received signal.

In this illustrative embodiment, a configuration of the second portable terminal 400B is also the same as that of the first portable terminal 400A. In FIG. 1, elements of the second portable terminal 400B are simplified. In the below descriptions, when describing the elements of the second portable terminal 400B, the reference numerals that are obtained by replacing the character 'A' of the corresponding element of the first portable terminal 400A with a character 'B' are used. For example, an element 410B of the second portable terminal 400B indicates the same CPU as the CPU 410A of the first portable terminal 400A. Also, a program 432B is the same as the program 432A. The CPU 410B acquires scan data 920d, which displays a document 920, from the second scanner 200B and enables the second printer 300B to print an image, which is represented by the scan data 920d, thereby generating a printed material 920p.

FIG. 2 is a schematic view illustrating the function information 134. The function information 134 illustrates a correspondence relation between a communication apparatus that can communicate with the server 100 and a function of the communication apparatus. In the example of FIG. 2, the scanners 200A, 200B, the printers 300A, 300B, the portable terminals 400A, 400B and the projector 500 are enumerated as the communication apparatus. As information for identifying the communication apparatus, an identifier (not shown) (for example, a network address such as an IP address, a MAC address and the like) on the network is used, for example. The function is as follows. That is, in the example of FIG. 2, 'scan' is set as the function of the scanners 200A, 200B, 'printing' is set as the function of the printers 300A, 300B, 'control' is set as the function of the portable terminals 400A, 400B and 'display' is set as the function of the projector 500. 'Control' indicates a function of controlling the image processing apparatus, i.e., a function of using the image processing apparatus.

When the communication apparatus is enabled to communicate with the server 100 (for example, when the communication apparatus is connected to the wireless network 90n), the CPU 110 of the server 100 inquires the communication apparatus, so that the correspondence relation is automatically set. Instead of this, a user may manually (for example, by operating the server 100) set the correspondence relation between the communication apparatus and the function.

FIG. 3 schematically illustrates the status information 136. The status information 136 indicates a correspondence relation between the image processing apparatus and the status of the image processing apparatus. As for the status, any one of 'C1: released', 'C2: connected', 'C3: reserved', 'C4: being used' and 'C5: be over' is set. 'C1: release' indicates a status where a communication session for image processing is not established, 'C2: connected' indicates a status where the communication session is established, 'C3: reserved' indicates a status where the image processing apparatus is reserved for the using thereof, 'C4: being used' indicates a status where the image processing by the image processing apparatus is being progressed and 'C5: be over' indicates a status where the image processing by the image processing apparatus is over. The status of the image processing apparatus is shifted in order of C1, C2, C3, C4 and C5. After the status C5, the communication session is released, so that the status is returned to C1. In the meantime, 'C2: connected' and 'C3: reserved' also indicate a status (i.e., a requested status) where a communication for instruction of the image processing is requested and the image processing has not started yet. Also, in this illustrative embodiment, when the status is 'C3: reserved' or 'C4: being used', a new communication session is prohibited from being established. Also, the five statuses form a candidate of the status information displaying a status of the image processing apparatus.

Also, a status of one set of image processing apparatuses consisting of a plurality of image processing apparatuses each of which executes a plurality of partial image processing constituting specific image processing is referred to as a 'combination status'. For example, the copy processing consists of scan processing and printing processing. The first scanner 200A and the first printer 300A can execute the scan processing and printing processing constituting the copy processing, respectively. Here, a combination of the status of the first scanner 200A and the status of the first printer 300A corresponds to the 'combination status.' In the below descriptions, an 'executing combination status' and a 'requested combination status' are described as an example of the combination status.

The 'executing combination status' indicates a status where the first scanner 200A is executing the scan processing and the first printer 300A is waiting for the scan data, for example. More generally, the 'executing combination status' indicates a status where at least one constituting the one set of image processing apparatuses of the plural image processing apparatuses is executing the partial image processing. In this illustrative embodiment, a status where a status of at least one image processing apparatus of the one set of image processing apparatuses is 'C4: being used' is the 'executing combination status'.

The 'requested combination status' indicates a status where the status of the first scanner 200A and the status of the first printer 300A are 'C3: reserved', respectively, for example. More generally, the 'requested combination status' indicates a status where the communication for instruction of specific image processing is requested for at least one image processing apparatus constituting the one set of image processing apparatuses of the plural image processing apparatuses and both image processing apparatus of the one set of image processing apparatuses has not started the partial image processing yet. In this illustrative embodiment, a status where a status of at least one image processing apparatus of the one set of image processing apparatuses is 'C2: connected' or 'C3: reserved' and the other image processing apparatuses of the one set of image processing apparatuses have not started the partial image processing yet is the 'requested combination status.' Each of 'C1: released', 'C2: connected' and 'C3: reserved' corresponds to the status where the partial image processing has not started yet.

The image processing apparatus can be used by a plurality of communication apparatuses having the function of 'control (FIG. 2)'. The 'status' of the image processing apparatus is set for each communication apparatus having the function of 'control'. For example, in the correspondence relation of FIG. 3, a status of the first scanner is 'C4: being used' for the first portable terminal and is 'C1: released' for the second portable terminal. As described later, the CPU 110 of the server 100 updates the status information 136 as the status of each image processing apparatus is changed.

FIGS. 4 to 7 are sequence diagrams illustrating an example of operations of the image processing system 1000. The operations of the image processing system 1000 (FIG. 1) are performed in order of FIGS. 4 to 7. The processing of the first portable terminal 400A is implemented as the CPU 410A executes the program 432A. The processing of the second portable terminal 400B is implemented as the CPU 410B executes the program 432B. The processing of the server 100 is implemented as the CPU 110 executes the program 132. In the below, it is assumed that the statuses (FIG. 3) of all the image processing apparatuses are 'C1: released' for all the portable terminals 400A, 400A at the start of the processing of FIGS. 4 to 7.

In step S100, a user of the first portable terminal 400A operates the operation unit 460A to thus start the program 432A. In step S110, the CPU 410A searches a communication apparatus that can communicate with the first portable terminal 400A. For example, the CPU 410A broadcasts a packet for search and receives a response from each communication apparatus, thereby specifying a communication apparatus that can communicate. The response from the communication apparatus may include a variety of information (for example, a network address, an apparatus name and a function (scan, printing and the like) that is provided by the communication apparatus).

In step S120, the CPU 410A requests the status information indicating a status of the communication apparatus that can communicate, to the server 100. For example, the CPU 410A transmits an identifier (for example, a net mask or SSID of the wireless network 90n) of the network, to which the first portable terminal 400A is connected, to the server 100. Instead of this, the CPU 410A may transmit an identifier (for example, the network address) of the communication apparatus detected in step S110 to the server 100.

In step S125, the CPU 110 of the server 100 extracts the status information of the communication apparatus, which can communicate with the first portable terminal 400A, from the status information 136 (FIG. 3) and transmits the extracted status information to the first portable terminal 400A. In this illustrative embodiment, the CPU 110 transmits the status information (FIG. 3) of the scanners 200A, 200B, the printers 300A, 300B and the projector 500 to the first portable terminal 400A. The CPU 110 specifies a communication apparatus that can communicate with the first portable terminal 400A by using the information (for example, the identifier of the network or identifier of the communication apparatus) received from the first portable terminal 400A.

In step S140, the CPU 410A of the first portable terminal 400A acquires the status information transmitted by the server 100. In step S150, the CPU 410A generates image data, which represents a status image on the basis of the acquired status information, and displays a status image, which is displayed by the generated image data, on the display device 450A. In the meantime, the status image is an image representing a status of the communication apparatus (including the image processing apparatus) associated with the status information.

Figure 8C:
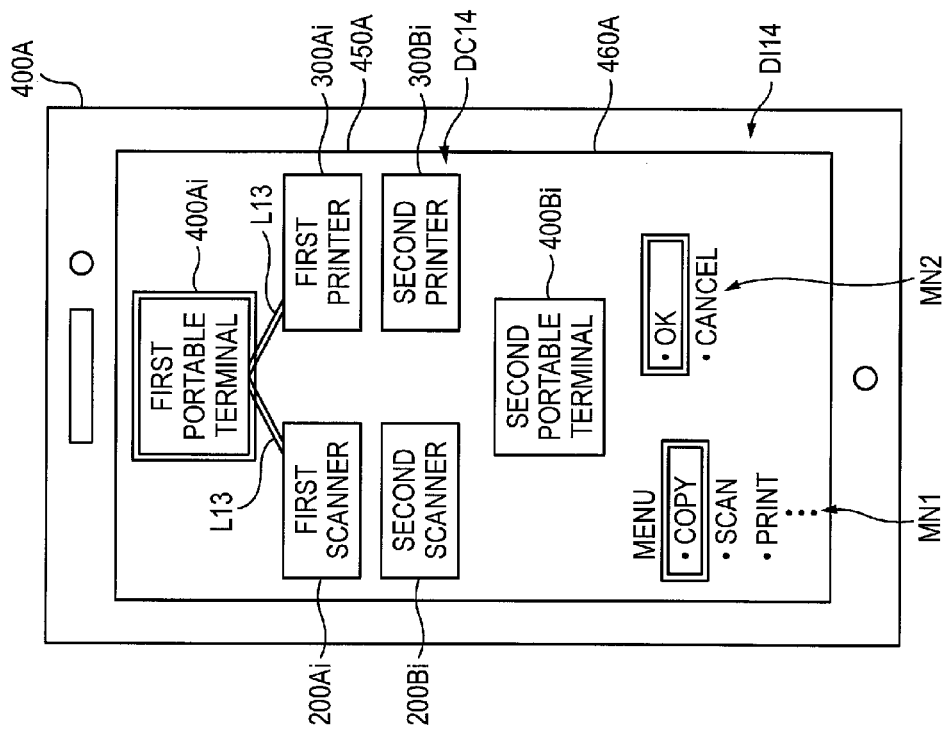

FIGS. 8A to 8D are schematic views illustrating an example of an image (referred to as a 'display image') that is displayed on the display device 450A of the first portable terminal 400A. FIG. 8A illustrates a display image DI11 that is displayed on the display device 450A in step S150 of FIG. 4. As shown, the display image DI11 includes a status image DC11 and a first menu MN1. The status image DC11 displays icons of the portable terminals 400A, 400B and the image processing apparatuses (i.e., the scanners 200A, 200B, the printers 300A, 300B and the projector 500) that can communicate with the first portable terminal 400A. In FIG. 8, each icon is denoted with a reference numeral of which a character 'i' is added to the reference numeral of the corresponding communication apparatus (which is also the same for the other status images that will be described later). For example, the icon 400Ai indicates the first portable terminal 400A. Also, in the example of FIG. 8, the icon includes an apparatus name (here, 'the first printer' and the like). The apparatus name can be acquired in step S110, S125 or S140. The icons of the respective communication apparatuses are arranged at positions spaced from each other. Also, the icon 400Ai indicating an own apparatus (i.e., the first portable terminal 400A) is displayed in a shape different from the icons of the other communication apparatuses (in the example of FIG. 8, the icon 400Ai of the own apparatus is shown with a double line). The first menu MN1 displays a list of image processing that can be executed. In this illustrative embodiment, the list of the image processing includes 'copy', 'scan' and 'print'. 'copy' is the image processing consisting of 'scan' and 'print'.

Figure 4:
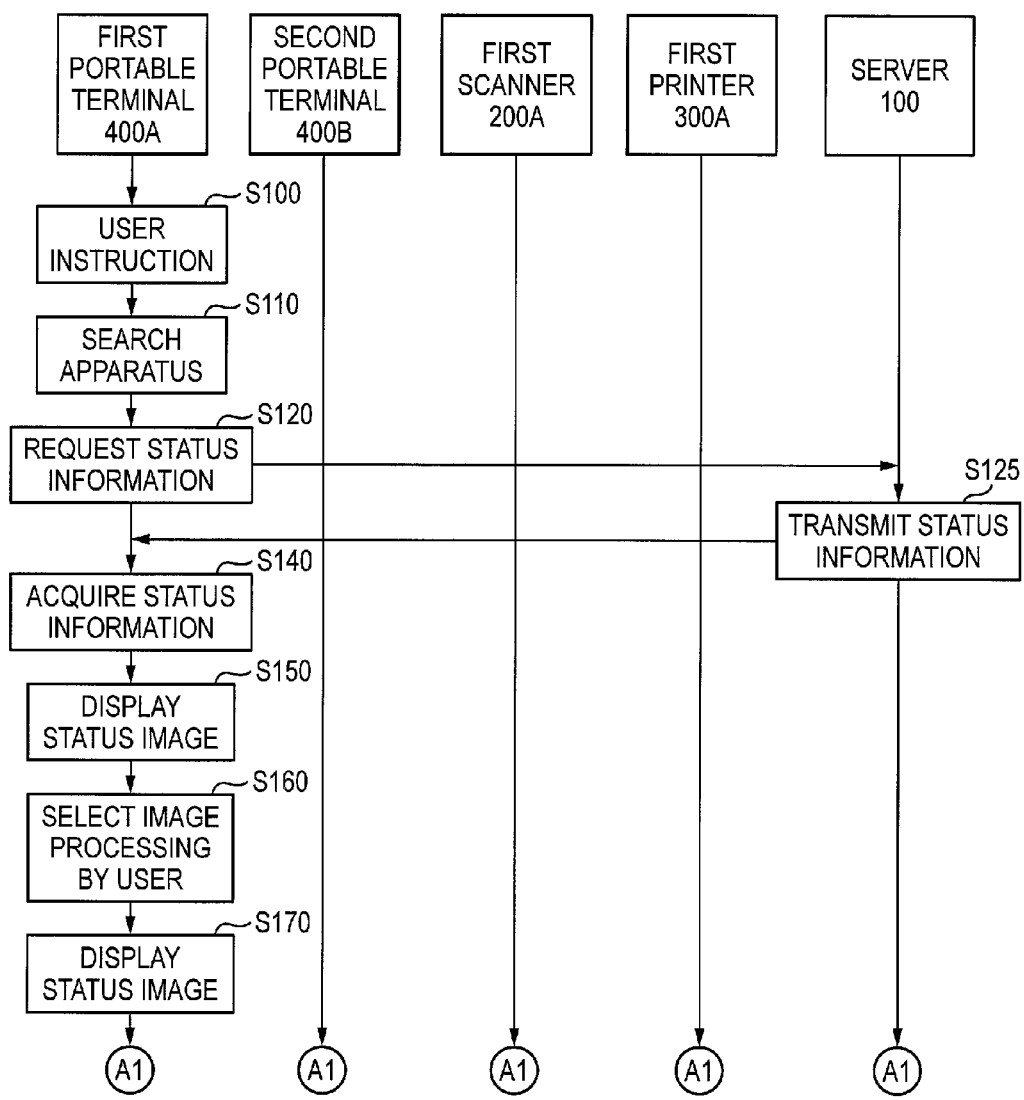
FIG. 4 is a sequence diagram illustrating an example of an operation of an image processing system.

In step S160 of FIG. 4, the user operates the operation unit 460A to thus designate the image processing from the first menu MN1, and the CPU 410A receives the user instruction of designating the image processing. In step S170, the CPU 410A updates the status image in accordance with the selected image processing and displays the updated status image on the display device 450A.

FIG. 8B illustrates a display image DI12 that is displayed on the display device 450A in step S170. In the example of FIG. 8B, 'copy' is selected as the image processing. The CPU 410A updates the status image so that the image processing apparatus capable of executing any one of 'scan' and 'print' constituting 'copy' is displayed. An updated status image DC12 is displayed on the display device 450A. As shown, an icon 500i of the projector 500 is omitted and the icons of the scanners 200A, 200B capable of executing the scan, the printers 300A, 300B capable of executing the print and the portable terminals 400A, 400B capable of using the image processing are respectively displayed.

In this way, the CPU 410A updates the status image so that the image processing apparatus capable of executing the selected image processing and the communication apparatus capable of using the image processing apparatus are displayed. The image processing incapable of executing the selected image processing is omitted from the status image. When the selected image processing is configured by a plurality of partial image processing, the CPU 410A updates the status image so that the image processing apparatus capable of executing any one partial image processing of the plural partial image processing is displayed. The image processing apparatus incapable of executing any partial image processing is omitted from the status image.

In the meantime, the CPU 410A of the first portable terminal 400A can specify the image processing (for example, 'scan', 'printing', 'display'), which can be executed by each image processing apparatus, in accordance with the information acquired from each image processing apparatus in step S110. Instead of this, the CPU 410A may acquire the function information 134 (FIG. 2) from the server 100 in steps S120, S125 and S140.

Figure 8D:
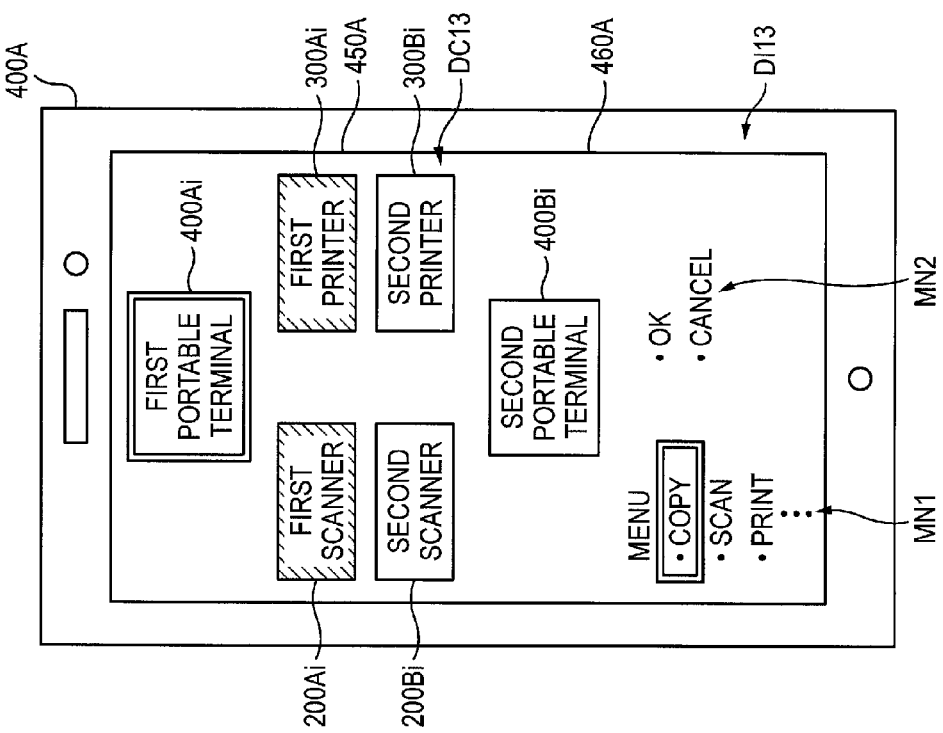

In step S180 (FIG. 5), the user operates the operation unit 460A to thus select the image processing apparatus that is used to execute the selected image processing from the plural image processing apparatuses displayed on the display device 450A. FIGS. 8C and 8D illustrate patterns where the image processing apparatuses are selected. In the example of FIG. 8C, the first scanner 200A and the first printer 300A are selected (in a status image DC13, the icons 200Ai, 300Ai of the selected apparatuses are hatched).

As the image processing apparatus is selected, the CPU 410A display a second menu MN2 for starting the image processing on the display device 450A (FIG. 8C; a display image DI13). The second menu MN2 includes 'OK' and 'cancel', as options. When the user selects 'OK', the CPU 410A starts the image processing. When the user selects 'cancel', the CPU 410A ends the processing. Here, it is assumed that 'OK' is selected.

Figure 5:
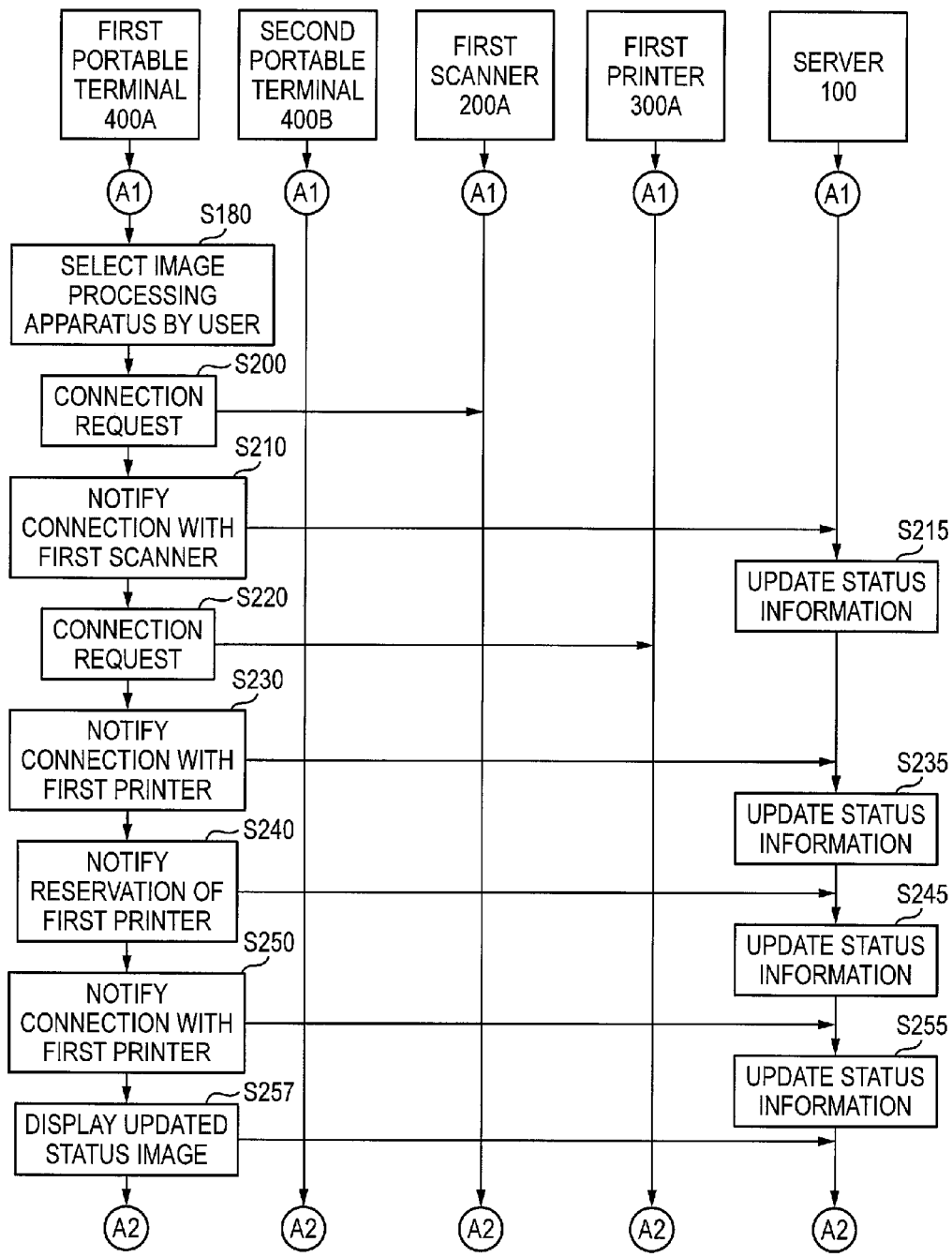
FIG. 5 is a sequence diagram illustrating an example of the operation of the image processing system.

Subsequently, the CPU 410A establishes the communication session with the selected image processing apparatus and reserves the selected image processing apparatus. In the example of FIG. 5, in step S200, the CPU 410A requests connection from the first scanner 200A. According to the request, the communication session (i.e., the communication session for image processing) is established between the first portable terminal 400A and the first scanner 200A. The first scanner 200A can receive a request for image processing (for example, a scan command and the like) through the established communication session.

In step S210, the CPU 410A notifies the server 100 that the communication session with the first scanner 200A is established. In step S215, the CPU 110 of the server 100 updates the status information 136 (FIG. 3) in accordance with the received notification. Here, the status of the first scanner 200A for the first portable terminal 400A is changed from 'C1: released' to 'C2: connected'.

In step S220, the CPU 410A of the first portable terminal 400A requests connection from the first printer 300A. According to the request, the communication session is established between the first portable terminal 400A and the first printer 300A. The first printer 300A can receive a request for image processing (for example, a print command and the like) through the established communication session. In step S230, the CPU 410A notifies the server 100 that the communication session with the first printer 300A is established. In step S235, the CPU 110 of the server 100 updates the status information 136 (FIG. 3) in accordance with the received notification. Here, the status of the first printer 300A for the first portable terminal 400A is changed from 'C1: released' to 'C2: connected'.

In step S240, the CPU 410A of the first portable terminal 400A notifies the server 100 that the first scanner 200A is reserved. In step S245, the CPU 110 of the server 100 updates the status information 136 (FIG. 3) in accordance with the received notification. Here, the status of the first scanner 200A for the first portable terminal 400A is changed from 'C2: connected' to 'C3: reserved'.

In step S250, the CPU 410A of the first portable terminal 400A notifies the server 100 that the first printer 300A is reserved. In step S255, the CPU 110 of the server 100 updates the status information 136 (FIG. 3) in accordance with the received notification. Here, the status of the first printer 300A for the first portable terminal 400A is changed from 'C2: connected' to 'C3: reserved'.

In step S257, the CPU 410A of the first portable terminal 400A updates the status image and displays the updated status image on the display device 450A. FIG. 8D illustrates a display image DI14 (a status image DC14) that is displayed on the display device 450A in step S257. As shown, the icon 400Ai of the first portable terminal 400A and the icon 200Ai of the first scanner 200A are connected to each other by a line L13. Likewise, the icon 400Ai of the first portable terminal 400A and the icon 300Ai of the first printer 300A are connected to each other by the line L13. The line L13 indicates that the status of the image processing apparatus for the portable terminal connected by the line L13 is 'C3: reserved'.

In step S260 (FIG. 6), the CPU 410A of the first portable terminal 400A transmits an instruction for scan start to the first scanner 200A. In the meantime, it is assumed that the user already sets a scan target (the document 910 (FIG. 1), in this example) on a document placement (for example, an automatic document feeder) of the first scanner 200A. In step S270, the CPU 410A notifies the server 100 that the scan by the first scanner 200A has started. In step S275, the CPU 110 of the server 100 updates the status information 136 (FIG. 3) in accordance with the notification. Here, the status of the first scanner 200A for the first portable terminal 400A is changed from 'C3: reserved' to 'C4: being used'.

Figure 6:
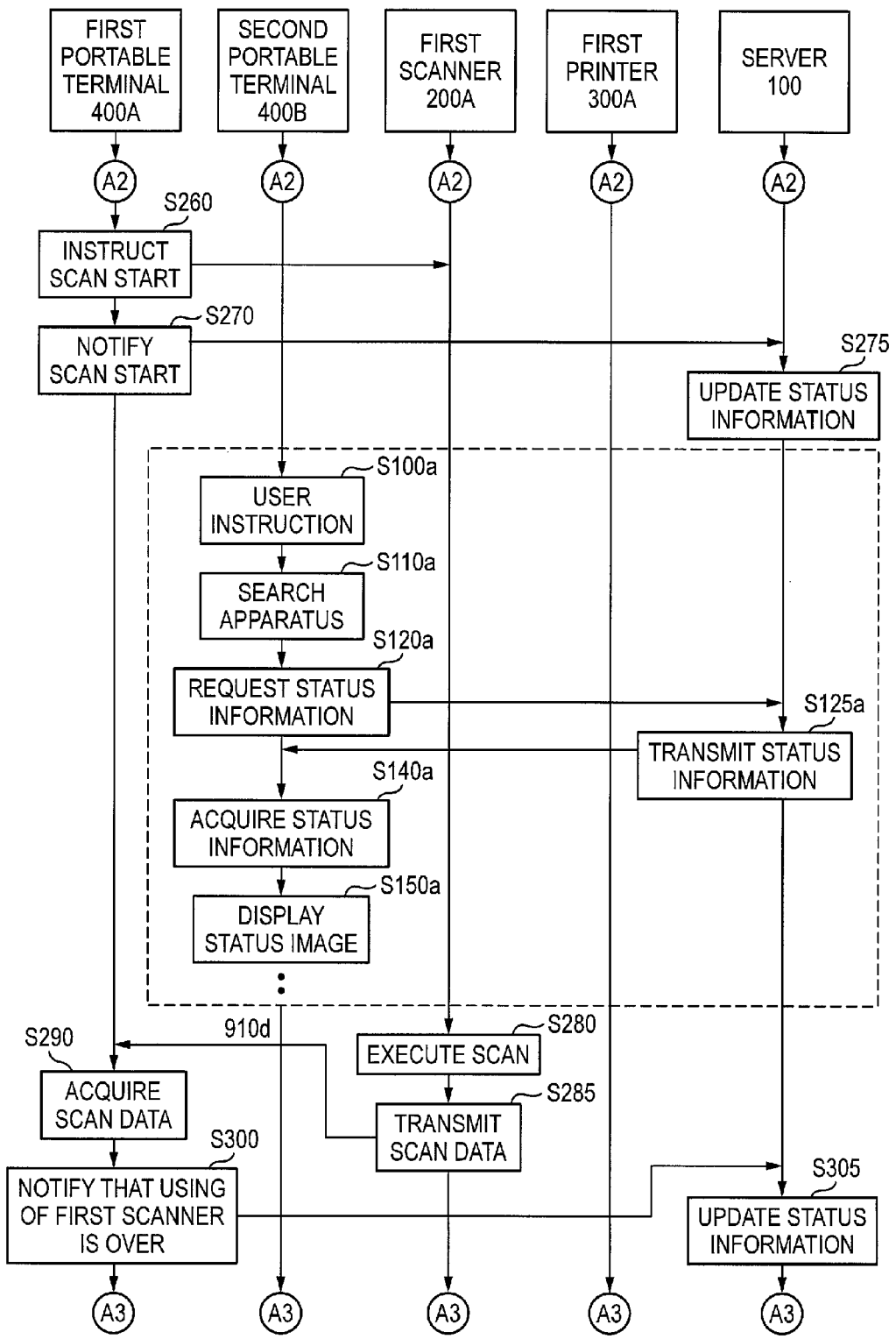
FIG. 6 is a sequence diagram illustrating an example of the operation of the image processing system.
Figure 7:
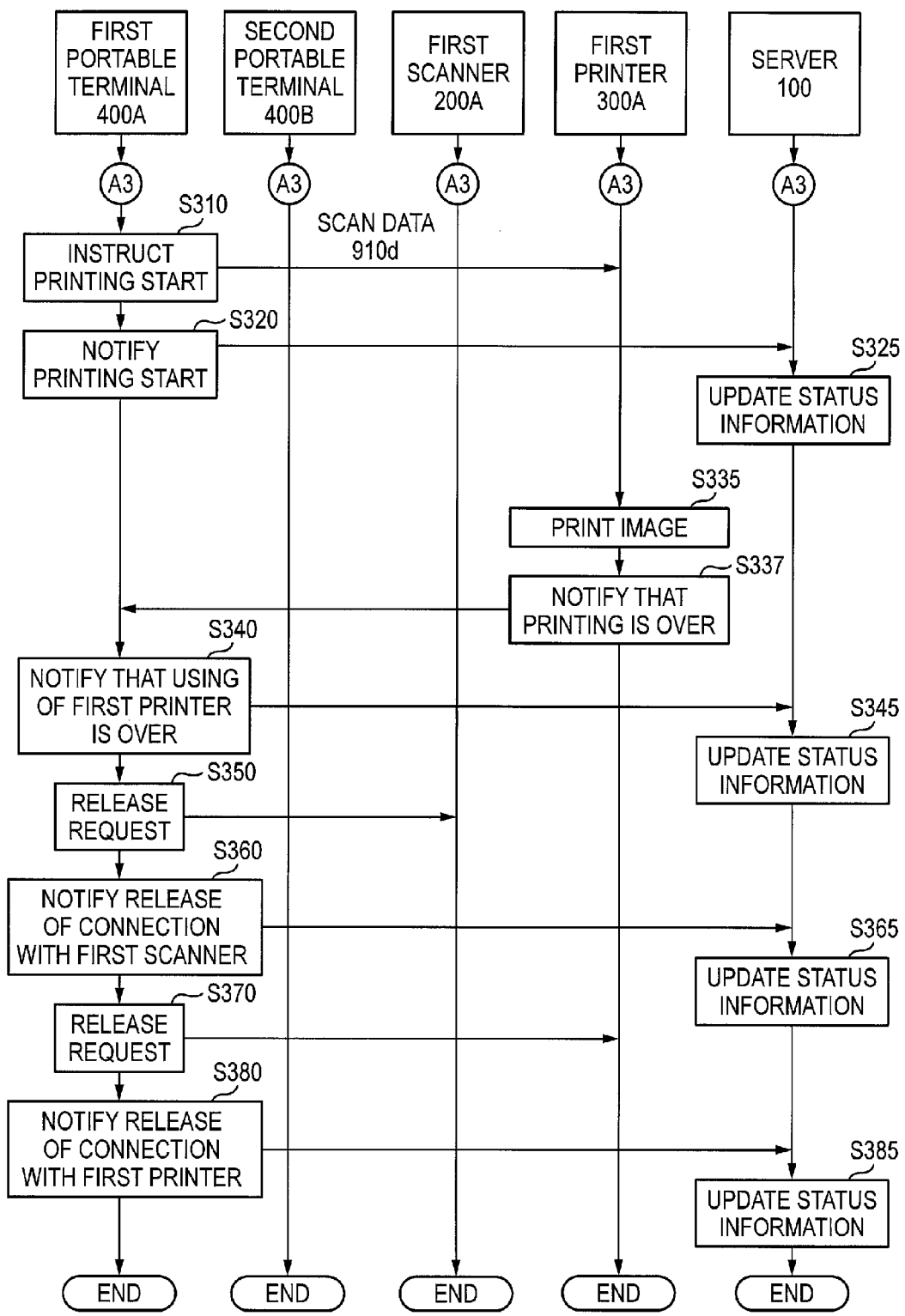
FIG. 7 is a sequence diagram illustrating an example of the operation of the image processing system.

In the example of FIG. 6, at this step, the CPU 410B of the second portable terminal 400B starts the processing in accordance with the program 432B, like the CPU 410A of the first portable terminal 400A. In FIG. 6, steps S100a, S110a, S120a, S125a, S140a and S150a are the same as the steps S100, S110, S120, S125, S140 and S150.

Figure 9D:
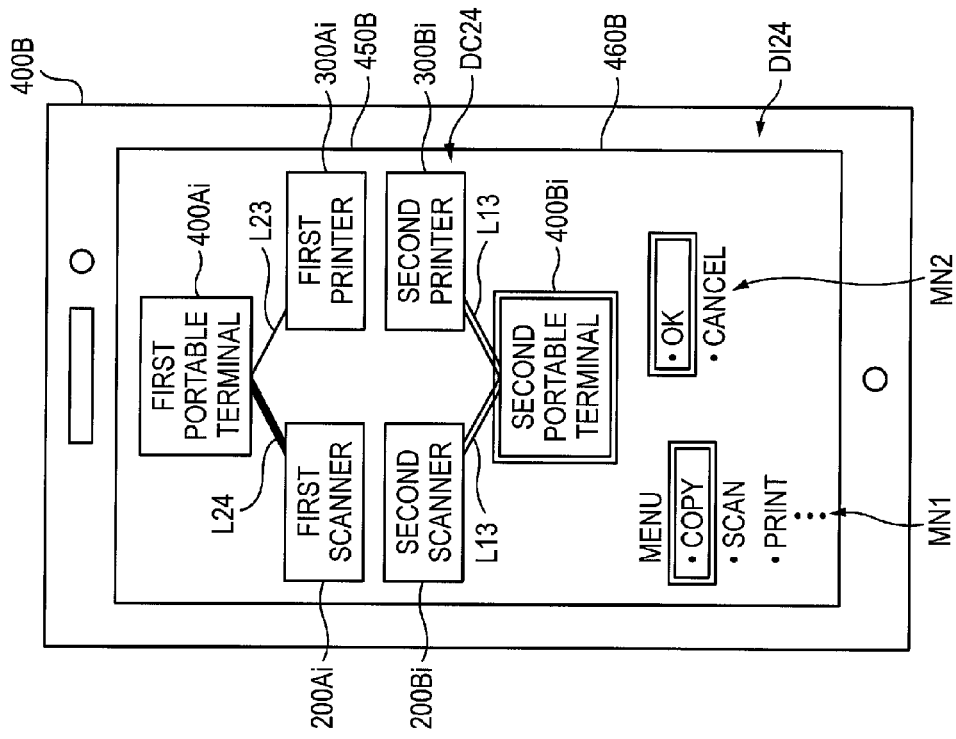

FIGS. 9A to 9D are schematic views illustrating an example of the display image that is displayed on the display device 450B of the second portable terminal 400B. FIG. 9A illustrates a display image DI21 (including a status image DC21) that is displayed in step S150a. Unlike the status image DC11 of FIG. 8A, the status image DC21 further has a line L24 that connects the icon 400Ai of the first portable terminal 400A and the icon 200Ai of the first scanner 200A and a line L23 that connects the icon 400Ai of the first portable terminal 400A and the icon 300Ai of the first printer 300A. The line L24 indicates that the status of the image processing apparatus is 'C4: being used' and the line L23 indicates that the status of the image processing apparatus is 'C3: reserved'. According to the status image DC21, a user of the second portable terminal 400B can easily perceive that the first portable terminal 400A uses a combination of the first scanner 200A and the first printer 300A.

Figure 9C:
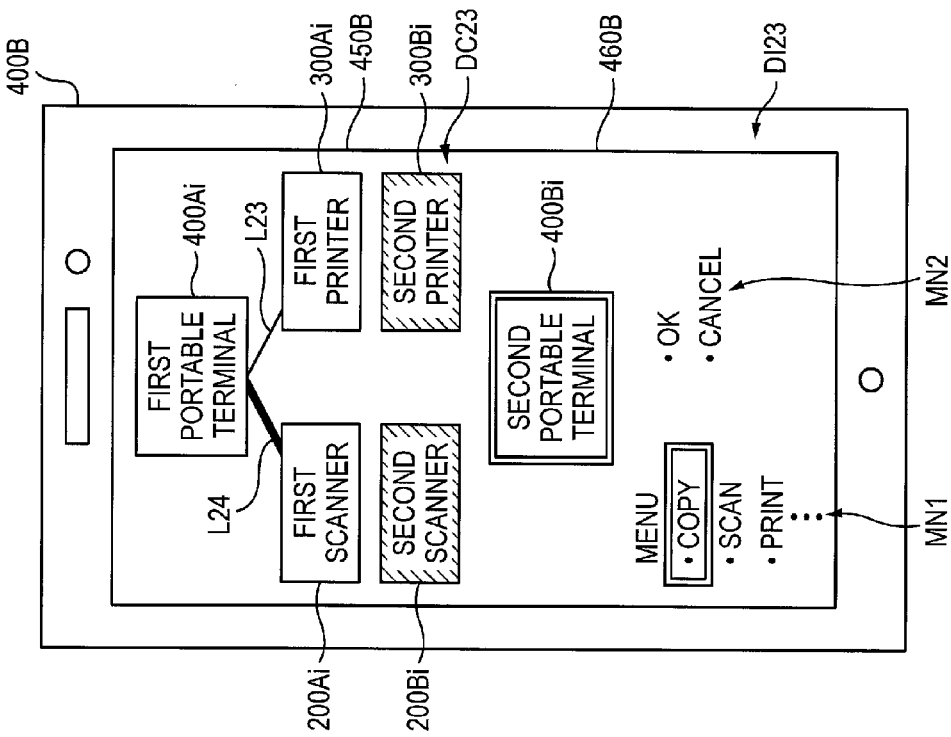

Here, it is assumed that the user of the second portable terminal 400B selects 'copy', as the image processing, and selects the second scanner 200B and the second printer 300B, as the image processing apparatus executing the copy. FIGS. 9B to 9D illustrate examples of a change in the display image.

Similarly to FIG. 8B, FIG. 9B illustrates a display image DI22 (including the first menu MN1 and a status image DC22) that is displayed when 'copy' is selected. Like the status image DC12 of FIG. 8B, the icon 500i of the projector 500 is omitted from the status image DC22.

Similarly to FIG. 8C, FIG. 9C illustrates a display image DI23 (including the menus MN1, MN2 and a status image DC23) that is displayed when two image processing apparatuses are selected. Here, the second scanner 200B and the second printer 300B are selected.

Meanwhile, in this illustrative embodiment, the CPUs 410A, 410B prohibit the image processing apparatus having the status 'C3: reserved' or 'C4: being used' from being selected. Even if a user intends to select the corresponding image processing apparatus, the CPUs 410A, 410B consider the corresponding selection as an invalid selection. Therefore, it is possible to suppress a time period, in which the image processing is completed, from being prolonged, which is caused when the image processing, which is not processed yet, is concentrated on some image processing apparatuses. However, the CPUs 410A, 410B may permit the selection, irrespective of the status.

Similarly to FIG. 8D, FIG. 9D illustrates a display image DI24 (including the menus MN1, MN2 and a status image DC24) that is displayed when 'OK' of the second menu MN2 is selected and the two apparatuses 200B, 300B are reserved. As shown, the icon 400Bi of the second portable terminal 400B and the icon 200Bi of the second scanner 200B are connected to each other by the line L13 and the icon 400Bi of the second portable terminal 400B and the icon 300Bi of the second printer 300B are connected to each other by the line L13.

The user who sees the status image DC24 can easily perceive that the first portable terminal 400A uses the combination of the first scanner 200A and the first printer 300A and the second portable terminal 400B uses the combination of the second scanner 200B and the second printer 300B. Also, the user can easily perceive that the first scanner 200A is being used by the first portable terminal 400A and the first printer 300A has been reserved by the first portable terminal 400A. Also, the user can easily perceive that the second scanner 200B and the second printer 300B have been reserved by the second portable terminal 400B.

Returning to FIG. 6, the image processing that is subsequently performed by the first portable terminal 400A is described. In step S280, the first scanner 200A executes the scan in response to the instruction from the first portable terminal 400A. The first scanner 200A generates the scan data 910d that represent the document 910 (FIG. 1). In step S285, the first scanner 200A transmits the generated scan data 910d to the first portable terminal 400A. In step S290, the CPU 410A of the first portable terminal 400A acquires the scan data 910d from the first scanner 200A. The CPU 410A temporarily stores the acquired scan data 910d in the storage device (for example, the volatile storage device 420A or non-volatile storage device 430A). Therefore, the scan is completed.

In step S300, the CPU 410A of the first portable terminal 400A notifies the server 100 that the using of the first scanner 200A is over (i.e., the scan is completed). In step S305, the CPU 110 of the server 100 updates the status information 136 (FIG. 3) in accordance with the received notification. Here, the status of the first scanner 200A for the first portable terminal 400A is changed from 'C4: being used' to 'C5: be over'.

In step S310 (FIG. 7), the CPU 410A of the first portable terminal 400A transmits a printing start instruction to the first printer 300A. Here, the CPU 410A transmits the scan data 910d (FIG. 1) to the first printer 300A. In step S320, the CPU 410A notifies the server 100 that the printing by the first printer 300A has started. In step S325, the CPU 110 of the server 100 updates the status information 136 (FIG. 3) in accordance with the notification. Here, the status of the first printer 300A for the first portable terminal 400A is changed from 'C3: reserved' to 'C4: being used'.

In step S335, the first printer 300A prints an image by using the received scan data 910d, in response to the instruction from the first portable terminal 400A. Thereby, the printed material 910p (FIG. 1) is generated. In step S337, the first printer 300A notifies the first portable terminal 400A that the printing is over. Thereby, the printing is completed.

In step S340, the CPU 410A of the first portable terminal 400A notifies the server 100 that the using of the first printer 300A is over (i.e., the printing is completed). In step S345, the CPU 110 of the server 100 updates the status information 136 (FIG. 3) in accordance with the received notification. Here, the status of the first printer 300A for the first portable terminal 400A is changed from 'C4: being used' to 'C5: be over'.

In step S350, the CPU 410A of the first portable terminal 400A requests the first scanner 200A to release the communication session. According to the request, the communication session between the first portable terminal 400A and the first scanner 200A is released. In step S360, the CPU 410A of the first portable terminal 400A notifies the server 100 that the communication session between the first portable terminal 400A and the first scanner 200A is released. In step S365, the CPU 110 of the server 100 updates the status information 136 (FIG. 3) in accordance with the received notification. Here, the status of the first scanner 200A for the first portable terminal 400A is changed from 'C5: be over' to 'C1: released'.

In step S370, the CPU 410A of the first portable terminal 400A requests the first printer 300A to release the communication session. According to the request, the communication session between the first portable terminal 400A and the first printer 300A is released. In step S380, the CPU 410A of the first portable terminal 400A notifies the server 100 that the communication session between the first portable terminal 400A and the first printer 300A is released. In step S385, the CPU 110 of the server 100 updates the status information 136 (FIG. 3) in accordance with the received notification. Here, the status of the first printer 300A for the first portable terminal 400A is changed from 'C5: be over' to 'C1: released'.

According to the above operations, the image processing (the copy consisting of the scan and the printing) by the first portable terminal 400A is over.

In the meantime, the display of the status image can be made at any timing. Also, as described in FIG. 3, the status of the image processing apparatus is changed among the five statuses. In this illustrative embodiment, the CPUs 410A, 410B of the portable terminals 400A, 400B generate the status image so as to display the image processing apparatuses in the shape capable of identifying at least a part of the statuses. In this illustrative embodiment, as shown in FIG. 9D, the different lines are used depending on the status of the image processing apparatus, as the line connecting the portable terminal and the image processing apparatus. As the lines, a variety of lines depending on the status of the image processing apparatus are used in addition to the lines shown in FIGS. 8 and 9.

Figure 10A:
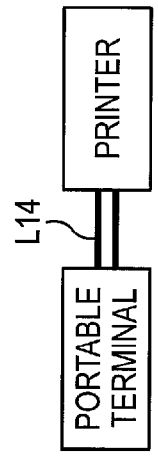
FIGS. 10A to 10F is schematic views illustrating an example of a line connecting a portable terminal and an image processing apparatus.
Figure 10B:
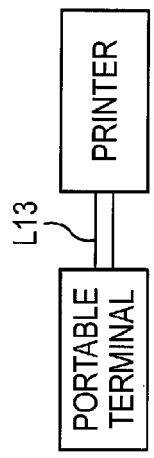
Figure 10C:
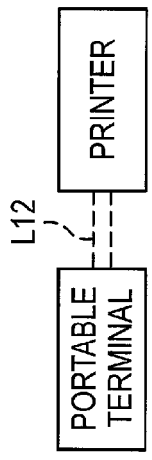
Figure 10D:
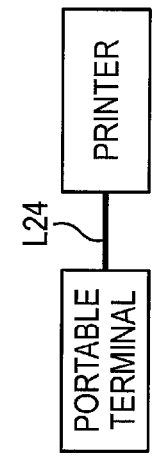
Figure 10E:
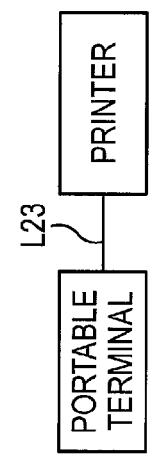
Figure 10F:
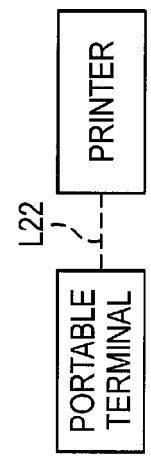

FIGS. 10A to 10F are schematic views illustrating examples of the line connecting the portable terminal and the image processing apparatus. FIGS. 10A to 10C illustrate lines L12, L13, L14 connecting the own apparatus and the image processing apparatus, and FIGS. 10D to 10F illustrate lines L22, L23, L24 connecting the other apparatus and the image processing apparatus. As shown, the own apparatus and the image processing apparatus are connected to each other by double line, and the other apparatus and the image processing apparatus are connected to each other by one line. Therefore, according to the status image, the user can easily perceive whether the apparatus using the image processing apparatus is the own apparatus or other apparatus.

Also, the lines L12, L22 of FIGS. 10A and 10D illustrate that the status of the image processing apparatus is 'C2: connected' and is indicated by a dotted line. The lines L13, L23 of FIGS. 10B and 10E illustrate that the status of the image processing apparatus is 'C3: reserved' and is indicated by a solid line. The lines L14, L24 of FIGS. 10C and 10F illustrate that the status of the image processing apparatus is 'C4: being used' and is indicated by a bold line.

Here, when the status of the image processing apparatus is 'C1: released' for all the communication apparatuses, i.e., when the number of communication sessions established between the communication apparatus and the image processing apparatus is zero, the corresponding image processing apparatus is referred to as a 'released apparatus.' Although not shown, an icon indicating the released apparatus is omitted in terms of the line display, unlike 'C2: connected', 'C3: reserved' and 'C4: being used', and is separately displayed from the icon of the other communication apparatus (for example, the communication apparatus having requested the execution of the image processing). Therefore, the user can easily perceive the status including the image processing apparatus of which the number of the established communication sessions is zero. Also, when the status of the image processing apparatus is 'C5: be over', the same lines L12, L22 as 'C2: connected' are displayed. According to the status image, the user can easily recognize the status of the image processing apparatus.

Also, as shown in FIG. 9D, two following statuses of the combination of the scanner and printer, which respectively execute the scan and print constituting the copy, are displayed in a distinguishable form. The first status is a status of the combination of the first scanner 200A and the first printer 300A where at least one of the scanner and the printer is executing the image processing (which corresponds to the 'executing combination status'). Specifically, the first scanner 200A is executing the scan. The second status is a status of the combination of the second scanner 200B and the second printer 300B where the communication for an image processing instruction is requested for at least one of the scanner and the printer and both the scanner and the printer has not started the image processing yet (which corresponds to the 'requested combination status'). As shown in FIG. 9D, the two statuses can be distinguished by the types of the lines connected to the icons of the image processing apparatuses. Therefore, according to the status image DC24, the user can easily perceive the status of the combination of the scanner and printer. Particularly, in the example of FIG. 9D, the user can easily perceive the status of the combination of the first scanner 200A and first printer 300A and the status of the combination of the second scanner 200B and second printer 300B, respectively.

Also, as described in steps S160 and S170 of FIG. 4 and in FIG. 8B, the CPU 410A receives the user instruction of designating the image processing. Then, the CPU 410A displays the status image, which represents the status of the image processing apparatus capable of executing any one of the plural partial image processing (for example, the scan and print constituting the copy) constituting the image processing designated by the user instruction, on the display device. Therefore, according to the status image, the user can easily perceive the status of the image processing apparatus capable of executing the partial image processing constituting the image processing designated by the user.

Also, as described in FIG. 3, the status information includes the information that displays the communication apparatus (also referred to as an 'execution instructing apparatus') having requested the image processing apparatus to execute the partial image processing. In the sequences of FIG. 4 to FIG. 7, the execution instructing apparatus is the portable terminals 400A, 400B. As shown in FIGS. 8D, 9 and 10, the CPUs 410A, 410B of the execution instructing apparatuses 400A, 400B display the status image, which represents the image indicating the execution instructing apparatus and the image indicating the image processing apparatus by the line with associated with each other, on the display devices 450A, 450B. Therefore, according to the status image, the user can easily perceive the status of the combination of the image processing apparatuses in association with the execution instructing apparatus.

Also, as described in FIGS. 9 and 10, when the status of the combination of the image processing apparatuses (for example, the combination of the scanner and printer) to be displayed is the executing combination status, the status image may include a post-start image and a pre-start image. The post-start image is an image indicating the image processing apparatus that has started the execution of the partial image processing, i.e., an image (refer to FIGS. 10C and 10D) indicating the image processing apparatus being executing the partial image processing. In the example of FIG. 9, both the icon 200Ai indicating the first scanner 200A and the line L24 correspond to the post-start image. The pre-start image is an image (refer to FIGS. 10A, 10B, 10D and 10E) indicating the image processing apparatus has not started the partial image processing yet. In the example of FIG. 9, both the icon 300Ai indicating the first printer 300A and the line L23 correspond to the pre-start image. Here, the post-start image and the pre-start image can be distinguished from each other by the type of the line. Therefore, according to the status image, the user can easily perceive that the combination of the image processing apparatuses includes the image processing apparatus that has started the partial image processing and the image processing apparatus having not started the partial image processing yet.

Also, in the status images DC11 to DC14 and DC21 to DC24 of FIGS. 8 and 9, a communication route between the communication apparatuses is not displayed. In this way, since the status image is simplified, the user can easily perceive the status of the image processing apparatus by according to the status image.

B. Second Illustrative Embodiment

Figure 11:
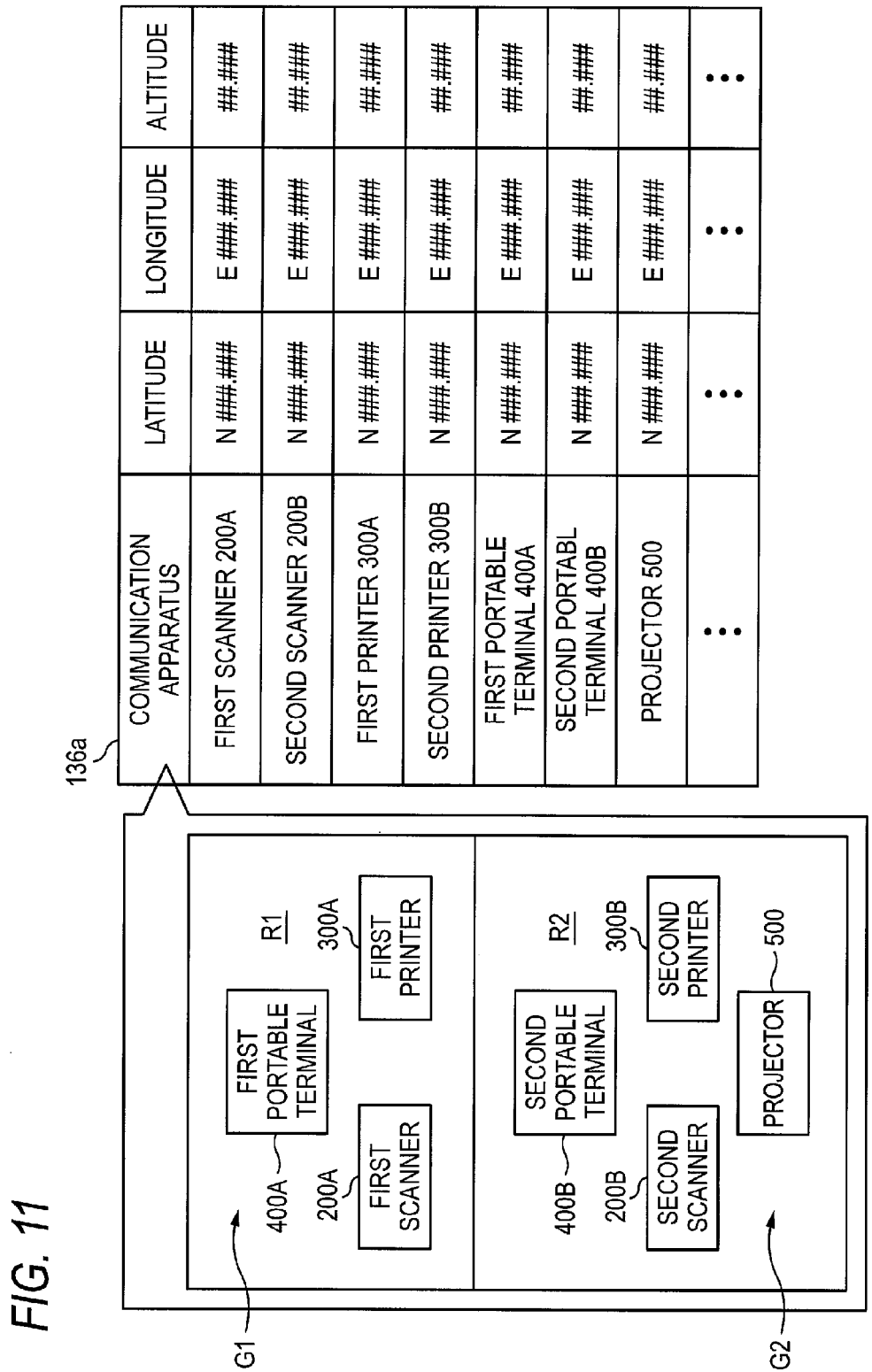
FIG. 11 is a schematic view illustrating another example of the status information.

FIG. 11 is a schematic view illustrating another illustrative embodiment of the status information. In the second illustrative embodiment, the status information includes not only the information described in FIG. 3 but also information (referred to as 'position information') indicating a position of each communication apparatus. In FIG. 11, added position information 136a is shown. In the second illustrative embodiment, the programs 432A, 432B of the portable terminals 400A, 400B (FIG. 1) are configured to display a status image reflecting the position information. The other configurations of the image processing system that is used in the second illustrative embodiment are the same as those of the image processing system 1000 (FIG. 1) of the first illustrative embodiment.

As shown in FIG. 11, the position information 136a indicates a latitude, a longitude and an altitude of each communication apparatus. The position information 136a can be set using any method. For example, the position information of the image processing apparatus can be set in advance by the user. For example, the user can adopt, as a position of the image processing apparatus, a position that is measured by the GPS receiver 470A of the portable terminal 400A when the portable terminal 400A is arranged to be close to the image processing apparatus. Specifically, when the user operates the operation unit 460A of the portable terminal 400A in the vicinity of the image processing apparatus, the CPU 410A transmits the identifier (for example, the IP address) of the image processing apparatus and the position information acquired by the GPS receiver 470A to the server 100. The CPU 110 of the server 100 associates the received position information with the image processing apparatus specified by the received identifier and registers the same in the position information 136a. The position information 136a is used in common by the plural communication apparatuses using the server 100. That is, when the position information of the image processing apparatus is once registered in the position information 136a, the other communication apparatus different from the portable terminal having registered the position information can also use the registered position information.

Also, the position information of the portable terminals 400A, 400B can be arbitrarily updated. For example, the positions of the portable terminals 400A, 400B can be measured by the GPS receivers 470A, 470B. The CPUs 410A, 410B of the portable terminals 400A, 400B notify the server 100 of the positions thereof when performing communication with the server 100 (for example, when requesting the status information or when notifying the start of the image processing). The CPU 110 of the server 100 updates the position information 136a in accordance with the received position.

At the left of FIG. 11, an arrangement example of the communication apparatuses is shown. The first portable terminal 400A, the first scanner 200A and the first printer 300A are arranged in a first room R1. The second portable terminal 400B, the second scanner 200B, the second printer 300B and the projector 500 are arranged in a second room R2 distant from the first room R1. When calculating a distance between the communication apparatuses in accordance with the position information 136a, a distance between the communication apparatuses in the first room R1 and a distance between the communication apparatuses in the second room R2 are relatively short and a distance between the communication apparatus in the first room R1 and the communication apparatus in the second room R2 is relatively long.

Figure 12:
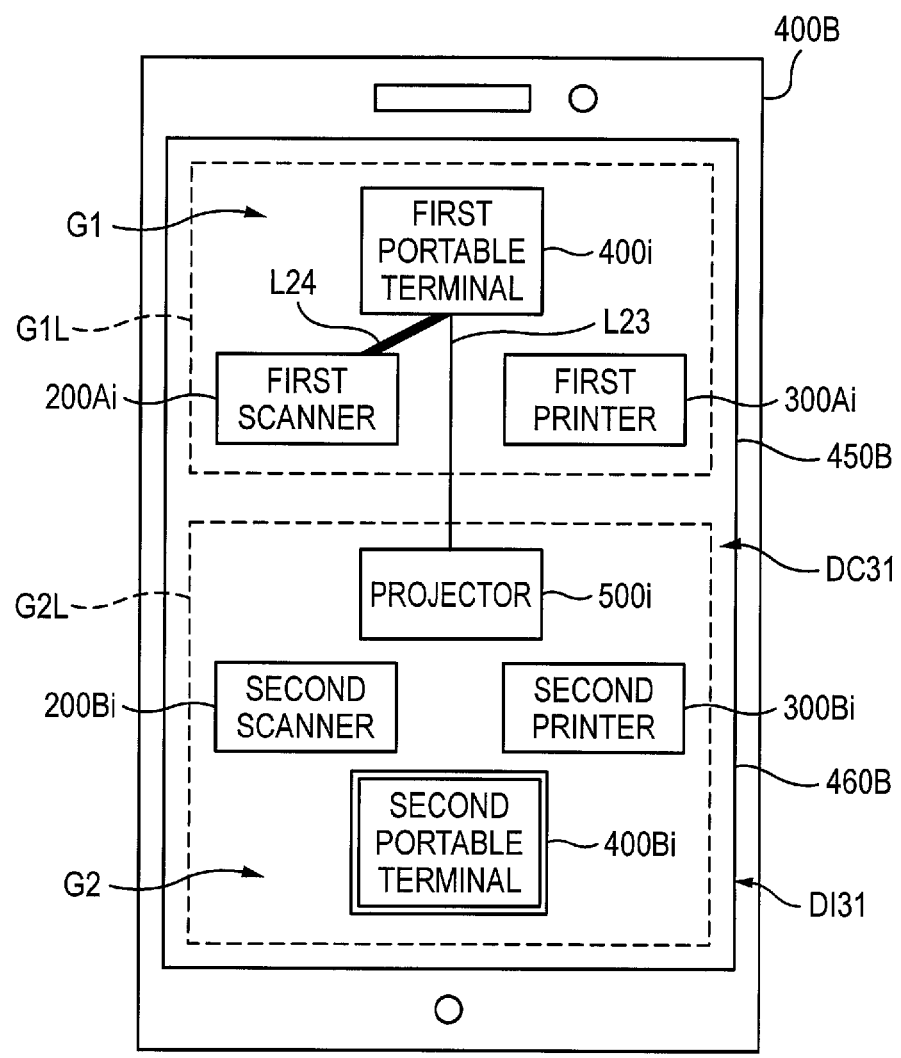
FIG. 12 is a schematic view illustrating an example of a status image of a second illustrative embodiment.

FIG. 12 is a schematic view illustrating an example of the status image of the second illustrative embodiment. In FIG. 12, a display image DI31 that is displayed on the display device 450B of the second portable terminal 400B is shown. The display image DI31 includes a status image DC31. The CPU 410B of the second portable terminal 400B generates image data displaying the status image DC31, in accordance with the position information 136a indicating the arrangement example of FIG. 11.

In this illustrative embodiment, the CPU 410B calculates distances between the communication apparatuses and divides the plural communication apparatuses into one or more groups, depending on the distances. One group consists of one or more communication apparatuses of which a distance from the common communication apparatus is a threshold or less. In the example of FIG. 11, a first group G1 consisting of the communication apparatuses 200A, 300A, 400A arranged in the first room R1 and a second group G2 consisting of the communication apparatuses 200B, 300B, 400B arranged in the second room R2 are formed. The CPU 410B generates the status image DC31 that displays the respective groups G1, G2 in a distinguishable form. In the example of FIG. 12, the respective groups G1, G2 are surrounded by encircling lines G1L, G2L.

According to the status image DC31, the user can easily perceive the positional relation and statuses of the image processing apparatuses. Also, the status image DC31 displays both the icon indicating the own apparatus (here, the second portable terminal 400B) and the icon indicating the image processing apparatus. Therefore, according to the status image DC31, the user can easily select the image processing apparatus that is close to the own apparatus.

C. Third Illustrative Embodiment

Figure 13:
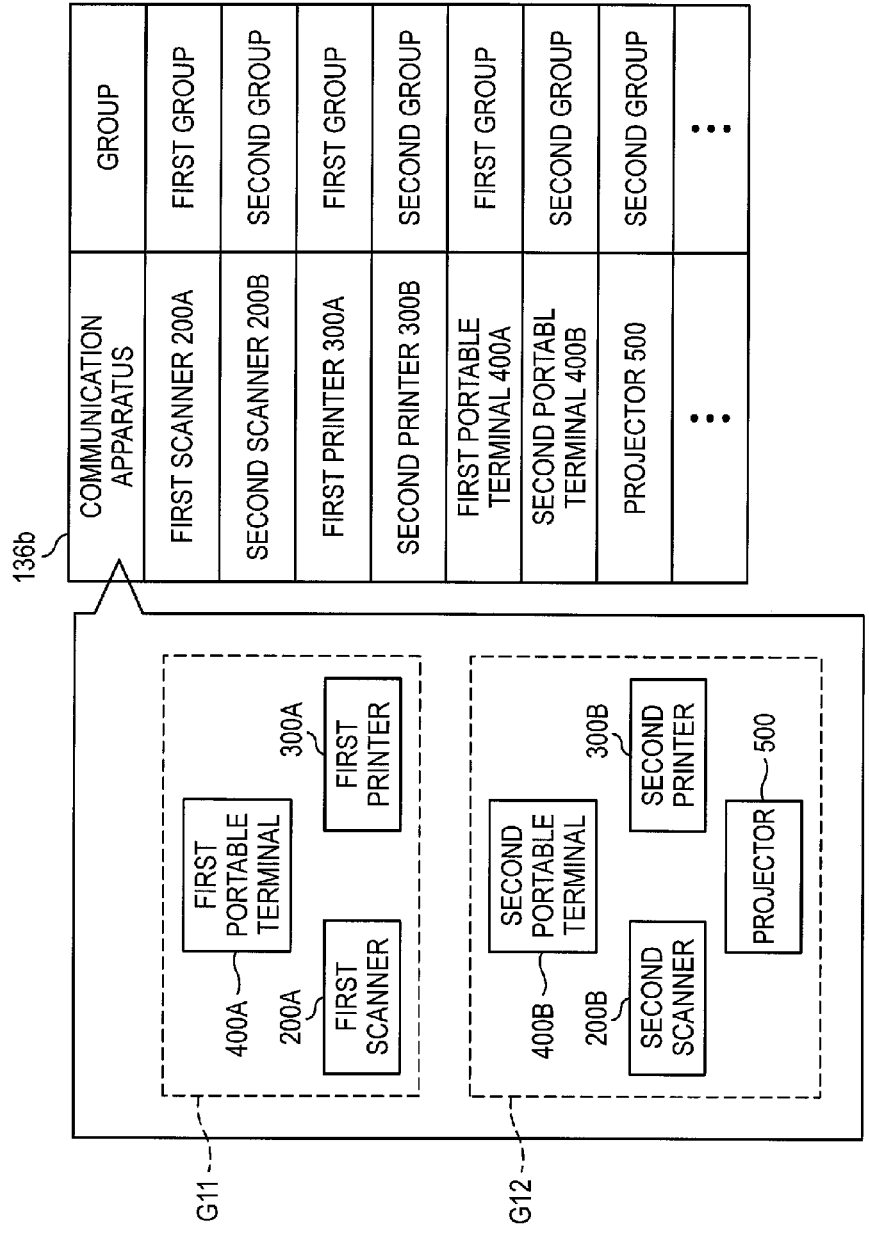
FIG. 13 is a schematic view illustrating another example of the status information.

FIG. 13 is a schematic view illustrating another illustrative embodiment of the status information. In the third illustrative embodiment, the status information includes not only the information described in FIG. 3 but also information (referred to as 'group information') indicating a group to which each communication apparatus belongs. In FIG. 13, added group information 136b is shown. In the third illustrative embodiment, the programs 432A, 432B of the portable terminals 400A, 400B (FIG. 1) are configured to display a status image reflecting the group information. The other configurations of the image processing system that is used in the third illustrative embodiment are the same as those of the image processing system 1000 (FIG. 1) of the first illustrative embodiment.

As shown in FIG. 13, the group information 136b illustrates groups to which the respective communication apparatuses belong. A correspondence relation between the communication apparatus and the group is set in advance by the user and is beforehand stored in the non-volatile storage device 130 of the server 100. For example, when the image processing system 1000 (FIG. 1) is used in a company, the user can adopt a sector as the group. Also, when the image processing system 1000 is used in a school, the user can adopt a classroom as the group. At the left of FIG. 13, an example of the group is shown. The first portable terminal 400A, the first scanner 200A and the first printer 300A belong to a first group G11. The second portable terminal 400B, the second scanner 200B, the second printer 300B and the projector 500 belong to a second group G12.

Figure 14:
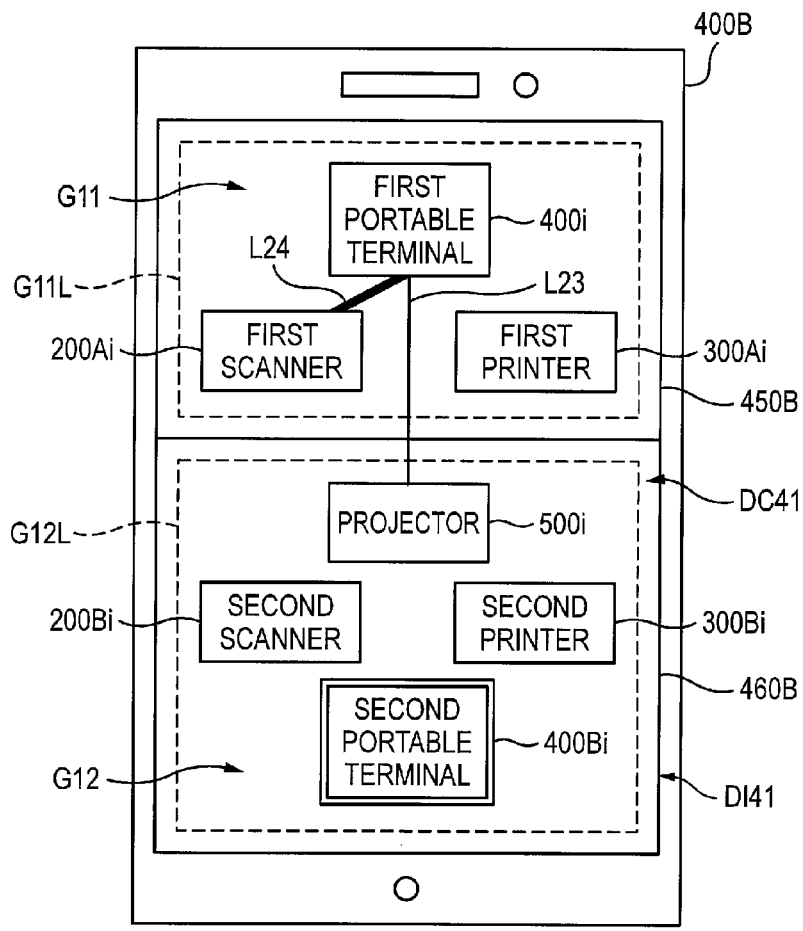
FIG. 14 is a schematic view illustrating an example of a status image of a third illustrative embodiment.

FIG. 14 is a schematic view illustrating an example of the status image of the third illustrative embodiment. In FIG. 14, a display image DI41 that is displayed on the display device 450B of the second portable terminal 400B is shown. The display image DI41 includes a status image DC41. The CPU 410B of the second portable terminal 400B generates image data displaying the status image DC41, in accordance with the group information 136b displaying the group example of FIG. 11.

In this illustrative embodiment, the CPU 410B generates the status image DC41 that displays the respective groups G11, G12 in a distinguishable form. In the example of FIG. 14, the respective groups G11, G12 are surrounded by encircling lines G11L, G12L.

According to the status image DC41, the user can easily perceive the groups of the image processing apparatuses. Also, the status image DC41 displays both the icon indicating the own apparatus (here, the second portable terminal 400B) and the icon indicating the image processing apparatus. Therefore, according to the status image DC41, the user can easily select the image processing apparatus that belongs to the same group as the own apparatus.

D. Fourth Illustrative Embodiment

Figure 15A:
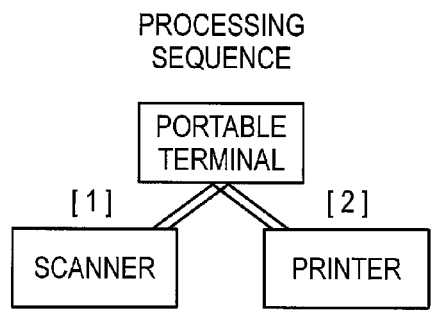
FIGS. 15A and 15B are schematic views illustrating another example of the status image.
Figure 15B:
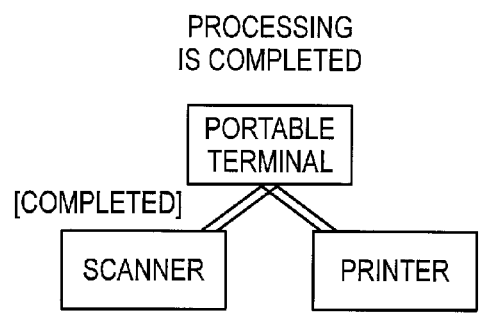
Figure 16A:
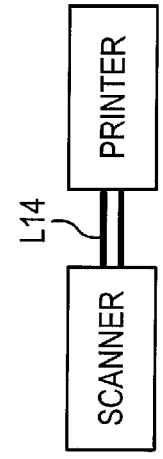
FIGS. 16A to 16F are schematic views illustrating another example of the status image.
Figure 16B:
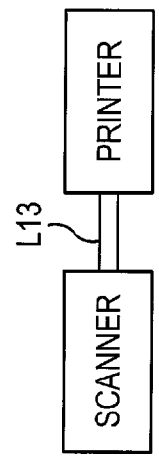
Figure 16C:
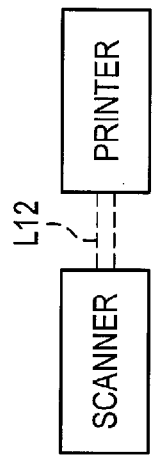
Figure 16D:
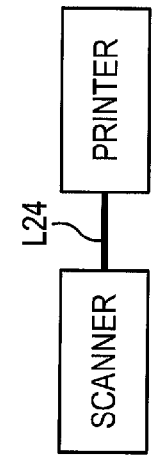
Figure 16E:
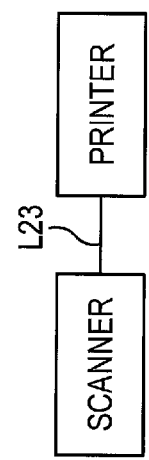
Figure 16F:
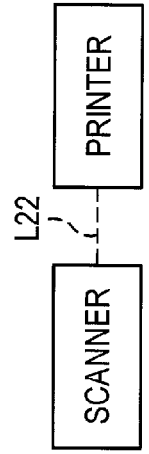

FIGS. 15A and 15B are schematic views illustrating another illustrative embodiment of the status image. The status image of FIG. 15A displays a processing sequence of the partial image processing, in addition to the status image of each illustrative embodiment. Specifically, numbers indicating a processing sequence of one set of the image processing apparatuses (here, the scanner and the printer) executing the image processing are attached in the vicinity of the icons of the respective image processing apparatuses. In the example of FIG. 15A, the processing sequence is in order of the scanner and the printer. According to the status image, the user can easily perceive the processing sequence of the partial image processing. In the meantime, the processing sequence of the partial image processing is preset depending on the image processing selected by the user. For example, when 'copy' is selected, the processing sequence is in order of 'scan' and 'print'.

The status image of FIG. 15B displays a character string indicating that the partial image processing is over, in addition to the status image described in the first illustrative embodiment. Specifically, the character string 'completed' is attached in the vicinity of the icon of the image processing apparatus of which the status is 'C5: be over'. For example, the status image of FIG. 15B indicates that the scanner has completed the partial image processing (herein, scan). According to the status image, the user can easily perceive which partial image processing is completed.

FIGS. 16A to 16F are schematic views illustrating another illustrative embodiment of the status image. This status image is different from the status image (for example, the status image DC14 of FIG. 8D) of each illustrative embodiment, in that the icons of the two combined image processing apparatuses are directly connected by the line and the icon (for example, the icon 400Ai) of the execution instructing apparatus is not displayed. FIGS. 16A to 16F illustrate the same statuses as FIGS. 10A to 10F. In the meantime, when the two image processing apparatuses have the different statuses, the line corresponding to one predetermined status of the two statuses is used. For example, when the status of the scanner is 'C4: being used' and the status of the printer is 'C3: reserved', the line L14 (FIG. 16A) associated with 'C4: being used' is used. For combinations having two different statuses, the line corresponding to the predetermined status is used for each combination.

Figure 17A:
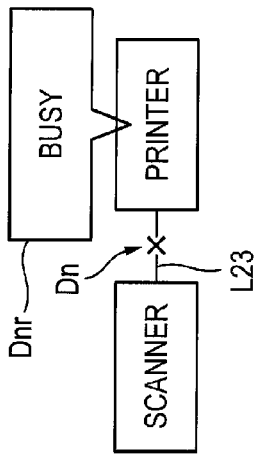
FIGS. 17A to 17D are schematic views illustrating another example of the status image.

FIGS. 17A to 17D are schematic views illustrating another illustrative embodiment of the status image. FIGS. 17A to 17D display the statuses of the combined scanner and printer. The status image of FIG. 17A displays a transmission image Dt that is an image representing that data is transmitted. In the example of FIG. 17A, the transmission image Dt includes an image representing a document and an arrow indicating a transmission direction of data. The transmission image Dt is arranged in the vicinity of the line being transmitting the data. In the example of FIG. 17A, the transmission image Dt is arranged in the vicinity of the line L14 connecting the icon of the scanner and the icon of the printer and indicates that the data is being transmitted from the scanner to the printer. According to the status image, the user can easily perceive the data transmission. In the meantime, although not shown, the actual data transmission can be relayed by the execution instructing apparatus (for example, the first portable terminal 400A).

Figure 17B:
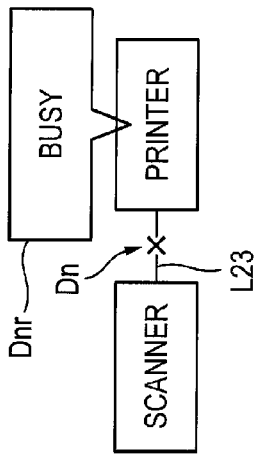

The status image of FIG. 17B displays an unavailable image Dn that is an image representing that the image processing apparatus cannot be temporarily used. For example, when the scanner has non-completed scan processing, the scanner cannot be temporarily used until the scan processing is completed. Also, when the printer has non-completed printing processing, the printer cannot be temporarily used until the printing processing is completed. The unavailable image Dn is arranged on the line connected to the icon of the image processing apparatus that cannot be used. In the example of FIG. 17B, the unavailable image Dn is 'X'. Also, in the example of FIG. 17B, the unavailable image Dn is arranged on the line L23 connecting the icon of the scanner and the icon of the printer. The unavailable image Dn indicates that at least one of the scanner and the printer cannot be used. According to the status image, the user can easily perceive that the image processing apparatus cannot be temporarily used.

Figure 17C:
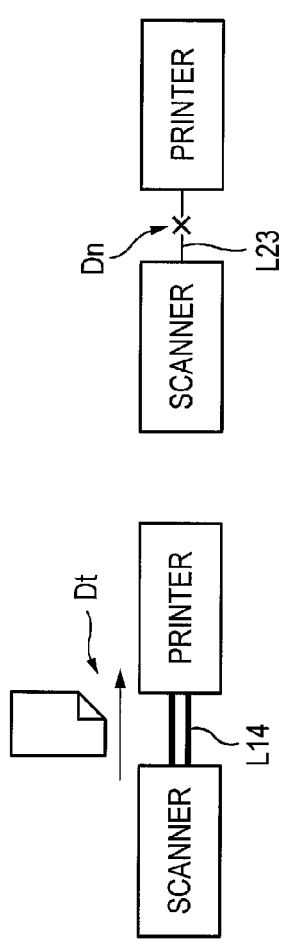

The status image of FIG. 17C displays the unavailable image Dn and a reason image Dnr that displays a reason for the unavailability. The unavailable image Dn is the same as the unavailable image Dn described in FIG. 17B. The reason image Dnr is a character string displaying the reason and is arranged in the vicinity of the image processing apparatus that cannot be temporarily used. In the example of FIG. 17C, the reason image Dnr indicates that the status of the printer is 'busy'. Here, 'busy' indicates that the image processing apparatus has the requested and non-completed image processing. According to the status image, the user can easily perceive the reason why the image processing cannot be temporarily used. In the meantime, the reason image Dnr is not limited to the character string and may be an arbitrary image such an icon associated with the reason.

Also, when displaying the image processing apparatus of which a queuing job count, which is a number of the non-completed image processing, is a predetermined threshold (for example, two (2)) or more, the CPUs 410A, 410B of the portable terminals 400A, 400B may display the unavailable image Dn, and when displaying the image processing apparatus of which the queuing job count is less than the threshold, the CPUs 410A, 410B may not display the unavailable image Dn. According to the status image, the user can easily perceive the image processing apparatus of which the queuing job count is large and the image processing apparatus of which the queuing job count is small.

Figure 17D:
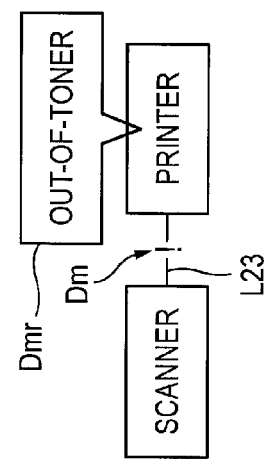

The status image of FIG. 17D displays an unavailable image Dm, which displays that the image processing apparatus cannot be temporarily used, and a reason image Dmr, which displays a reason for the unavailability. The unavailable image Dm is different from the unavailable image Dn of FIG. 17B, in that it displays that a job is required to solve the reason for the unavailability of the image processing apparatus. For example, when the printer is out of a color material (for example, toner), it is necessary to supplement the color material so as to use the printer. Also, when a sheet is jammed on the automatic document feeder of the scanner, it is necessary to remove the jammed sheet so as to use the scanner. When the image processing apparatus cannot be used due to the reason, the unavailable image Dm is displayed.

The unavailable image Dm is arranged on the line connected to the icon of the image processing apparatus that cannot be used. In the example of FIG. 17D, the unavailable image Dm is '!'. Also, in the example of FIG. 17D, the unavailable image Dm is arranged on the line L23 connecting the icon of the scanner and the icon of the printer. The unavailable image Dm indicates that at least one of the scanner and the printer cannot be temporarily used.

The reason image Dmr is a character string that displays a reason, and is arranged in the vicinity of the image processing apparatus that cannot be temporarily used. In the example of FIG. 17D, the reason image Dmr indicates that the status of the printer is 'out-of-toner'. In the meantime, the reason image Dmr is not limited to the character string and may be an arbitrary image representing the reason, such as an icon.

According to the status image, the user can easily perceive that an action is required so as to use the image processing apparatus. In the meantime, when displaying the unavailable image Dm, the reason image Dmr may be omitted.

Also, in the status images of FIGS. 17A to 17D, the icon of the execution instructing apparatus (for example, the portable terminal 400A) may be added, like the status image of FIG. 15.

When adopting any one of the status images of FIGS. 15, 16 and 17, the program 132 of the server 100 is configured so that following information necessary to display the adopted status information is managed by the CPU 110, as a part of the status information. The information to be managed may include information that specifies the image processing apparatus transmitting or receiving data, information indicating whether the image processing apparatus can be used, information indicating a reason for unavailability of the image processing apparatus and the queuing job count. The CPU 110 of the server 100 can acquire the information by inquiring of the server 100 for the information. The CPU 110 may periodically perform the inquiry. Also, the CPU 110 may specify the information from information received from the execution instructing apparatus.

Also, when adopting any one of the status images of FIGS. 15, 16 and 17, the programs 432A, 432B of the portable terminals 400A, 400B (FIG. 1) are configured so that the adopted status image is displayed on the display devices 450A, 450B by the CPUs 410A, 410B. The CPUs 410A, 410B acquire the status information, which is used to display the status image, from the server 100. Meanwhile, the CPUs 410A, 410B may directly acquire a part of the status information from the image processing apparatus.

E. Fifth Illustrative Embodiment

FIGS. 18A and 18B are schematic views illustrating another illustrative embodiment of the status image. This illustrative embodiment is different from the respective illustrative embodiments, in that the display function of the status image implemented by the programs 432A, 432B of the portable terminals 400A, 400B has a plurality of display modes. The other configurations of the portable terminals 400A, 400B are the same as those of the first illustrative embodiment shown in FIG. 1.

FIG. 18A illustrates an example of the display image that is displayed on the display device 450B of the second portable terminal 400B. The shown display image DI51 includes a status image DC51 and a menu MN3. In this example, the first portable terminal 400A, the second portable terminal 400B, the first scanner 200A and the first printer 300A can communicate through a common relay apparatus (the access point 90). Although not shown, the server (which is the same as the server 100 of FIG. 1) can also communicate through the access point 90.

The menu MN3 displays a list of display targets. The list includes a variety of statuses of the image processing apparatus, including the statuses 'being used' and 'reserved', and a 'communication route'. The user can select any display target from the list.

In the example of FIG. 18A, all display targets in the menu MN3 are selected. The status image DC51 displays the statuses of the first scanner 200A and the first printer 300A, which are used by the first portable terminal 400A, by using the lines L23, L24, like the first illustrative embodiment. Furthermore, the status image DC51 displays a line Lc that displays the communication route between the communication apparatuses.

FIG. 18B illustrates another example of the display image. The shown display image DI52 includes a status image DC52 and the menu MN3. In this example, the 'communication route' is not selected and the other display targets in the menu MN3 are selected. The status image DC52 displays an image in which the line Lc displaying the communication route and an icon 90i of the relay apparatus (the access point 90) are omitted from the status image DC51 of FIG. 18A.

Although not shown, when the display target displaying the status of the image processing apparatus is excluded from the selection items in the list of the menu MN3, a line displaying the excluded state is not displayed. For example, when the status 'reserved' is excluded from the selection, the lines L13, L23 (FIGS. 10B and 10E) displaying the status 'reserved' are not displayed.

As described above, in this illustrative embodiment, the CPUs 410A, 410B of the portable terminals 400A, 400B display the status image, which represents the status selected by the user, on the display devices 450A, 450B. Therefore, the user can easily perceive the status that the user wants to know. Also, as shown in FIG. 18A, the CPUs 410A, 410B can display the status image, which represents the communication route between the communication apparatuses, on the display devices 450A, 450B. Therefore, when the user wants to specify the communication route in a case, for example, where a problem occurs with respect to the communication, the user can easily specify the communication route.

In the meantime, any method for specifying the communication route can be arbitrarily applied. For example, when searching the communication apparatus (FIG. 4: S110), the CPUs 410A, 410B of the portable terminals 400A, 400B can specify the communication route by referring to a response from the communication apparatus. Instead of this, the server 100 may manage the communication route information. In this case, the CPUs 410A, 410B may inquire of the server 100 for the communication route.

F. Modified Embodiments (1) The statuses of the image processing apparatus, which can be distinguished on the status image, are not limited to the above illustrative embodiments, and various statuses can be adopted. For example, plural statuses that are arbitrarily selected from the five statuses of FIG. 3 may be handled as one status. For example, the four statuses except for 'C4: being used' may be handled as one status, and two statuses 'C4: being used' and 'the others' may be distinguished on the status image. Also, a status that is not shown in FIG. 3 may be used.

(2) The status image representing the status of the image processing apparatus is not limited to the status images of the above illustrative embodiments, and a variety of images can be adopted. For example, the line may be expressed with a color that is determined depending on the status. Also, the line may be expressed with a thickness that is determined depending on the status. Also, the status image may display a status without using the line. For example, the image (for example, the icon) indicating the image processing apparatus may be expressed with a color that is determined depending on the status. Also, the character string indicating the status may be displayed. Also, a character string that displays the communication apparatus (including the image processing apparatus) may be displayed instead of the icon. Also, the image that associates and displays the execution instructing apparatus and the image processing apparatus is not limited to the image representing the line connecting both the apparatuses, and a variety of images can be adopted. For example, an image in which the image representing the execution instructing apparatus and the image representing the image processing apparatus are expressed with the same color may be adopted. Also, an image representing a table displaying a correspondence relation between the execution instructing apparatus and the image processing apparatus may be adopted. Also, the status image reflecting the position of the image processing apparatus is not limited to the image shown in FIG. 12, and various images reflecting the position can be adopted. For example, a map image representing a positional relation between the own apparatus and other communication apparatus (including the image processing apparatus) may be adopted.

Also, in the illustrative embodiments of FIGS. 12 and 14, the status images that distinguishably represent the respective groups G1, G2, G11, G12 are not limited to the images displaying the encircling lines G1L, G2L, G11L, G12L, and various images can be adopted. For example, an image having a gap between the respective groups or an image having different colors for each group may be adopted. Also, an image representing a table representing the image processing apparatuses of the respective groups may be adopted. In any case, the apparatus (for example, the portable terminals 400A, 400B) using the image processing apparatus is preferably displayed as a member of any one group.

In general, a variety of images that are configured to enable the user to perceive the status of the image processing apparatus by seeing the image can be adopted as the status image.

(3) The sequence of the image processing is not limited to the sequence described in FIGS. 4 to 7, and a variety of sequences can be adopted. For example, the programs 432A, 432B may be configured to stop the processing in accordance with a user instruction during the processing. For example, the processing may be stopped by the user before a reservation is made after the communication session between the portable terminal and the image processing apparatus is established. In this case, the status of the image processing apparatus is not shifted to 'C3: reserved' and is maintained at the status 'C2: connected'. After that, when the communication session is released, the status is shifted to 'C1: released'. Also, the 'reservation of the image processing apparatus' may be omitted. In this case, 'C3: reserved (FIG. 3) that is the status of the image processing apparatus is omitted. Also, the connection request (i.e., the request for establishment of the communication session) for the image processing apparatus may be made when the start of the image processing by the image processing apparatus is instructed. Also, when the execution instructing apparatus uses the one set of the image processing apparatuses, the execution instructing apparatus may instruct only one image processing apparatus to start the image processing and the image processing apparatus having received the instruction may instruct the other image processing apparatus to start the image processing. For example, in the above illustrative embodiment, the CPU 410A of the first portable terminal 400A may instruct the first scanner 200A to start the scan and to transmit an instruction of the printing start to the first printer 300A, and when the scan is completed, the first scanner 200A may transmit the scan data to the first printer 300A without via the first portable terminal 400A, thereby instructing the first printer 300A to start the printing.

Also, the programs 432A, 432B may be configured to switch the type of the status image, in accordance with the type of the status information acquired by the CPUs 410A, 410B. For example, when the status information includes the position information 136a (FIG. 11), the status image (for example, the status image DC31 of FIG. 12) reflecting the position may be displayed, and when the status image includes the group information 136b (FIG. 13), the status image (for example, the status image DC41 of FIG. 14) in which the groups are distinguishably represented may be displayed.

Also, the image processing that is implemented by the combination of the plural image processing apparatuses is not limited to 'copy' and a variety of processing may be adopted. For example, 'scan display' may be adopted. The 'scan display' is processing of displaying an image, which is read by the scanner, on the display device (for example, the projector 500). Also, the number of the image processing apparatuses that are used for the image processing is not limited two (2) and three or more image processing apparatuses may be used. Also, the image processing to be executed is not selected by the user but may be preset. In general, in implementing the image processing by using one set of the image processing apparatuses (i.e., two or more image processing apparatuses), when the status image as described above is displayed, the user can easily perceive the statuses of the image processing apparatuses.

(4) The sequence of acquiring the status information is not limited to the sequence described in FIGS. 4 to 7, and a variety of methods can be adopted. For example, when updating the status image, the CPUs 410A, 410B of the portable terminals 400A, 400B may acquire the status information from the server 100. Also, as for the status of the image processing apparatus that is used by the own apparatus, the CPUs 410A, 410B may specify the status on the basis of a progressing situation of the processing that is executed by the own apparatus, instead of acquiring the status from the server 100. Also, the CPUs 410A, 410B may directly inquire of the image processing apparatus for the status.

Also, as for the method of managing the status information by the server 100, various methods can be adopted. For example, whenever the execution instructing apparatus (for example, the portable terminal 400A) transmits the request or instruction to the image processing apparatus, it may notify the server 100 of contents thereof. The CPU 110 of the server 100 may update the status information 136 in accordance with the notification. Also, the CPU 110 may periodically inquire of the image processing apparatus for the status.

(5) As the communication apparatus (i.e., the execution instructing apparatus) using the image processing apparatus, a communication apparatus (for example, a digital camera, a PC and the like) different from the portable terminals 400A, 400B may be adopted.

In any case, the CPUs 410A, 410B that executes the function of acquiring the status information correspond to the acquisition unit that acquires the status information. The CPUs 410A, 410B that executes the function of displaying the status image, which is an image for displaying the status of the image processing apparatus associated with the status information, on the display device correspond to the status display unit that displays the status image on the display device. The CPUs 410A, 410B that executes the function of receiving a user instruction of designating specific image processing correspond to the reception unit that receives the user instruction.

(6) In the respective illustrative embodiments, a part of the configuration that is implemented by the hardware may be replaced with software. To the contrary, a part or entirety of the configuration that is implemented by the software may be replaced with hardware. For example, the function of displaying the status image (for example, generating and updating the image data) may be implemented by a dedicated hardware circuit having a logical circuit.

Also, when a part or entirety of the functions of this disclosure is implemented by a computer program (instructions), the program may be provided with being recorded in a computer-readable recording medium (for example, a non-transitory recording medium). The program may be used with being the same as it is provided or with being recorded in another recording medium (a computer-readable recording medium). The 'computer-readable recording medium' is not limited to a portable recording medium such as a memory card or CD-ROM and includes an internal storage device in a computer, such as a variety of ROMs and the like, and an external storage device connected to a computer, such as a hard disk drive and the like.

Although this disclosure has been described with reference to the illustrative embodiments and the modified embodiments, the illustrative embodiments of this disclosure are just provided to easily understand this disclosure and do not limit this disclosure. This disclosure can be modified and improved without departing from the scope thereof and the claims and includes equivalents thereto.

What is claimed is:

1. A non-transitory computer-readable medium having instructions to control a processor to execute:
acquiring status information related to a status of at least one image processing apparatus, the at least one image processing apparatus being included in a plurality of image processing apparatuses connected to a network; and displaying a status image, which is an image representing the status of the image processing apparatus associated with the acquired status information, on a display device, wherein a combination status is status being related to one set of image processing apparatuses, each of which executes each of a plurality of partial image processing constituting specific image processing, of the plurality of image processing apparatuses, wherein in the combination status, an executing combination status is a status where at least one apparatus of the one set of the image processing apparatuses is executing the partial image processing of the specific image processing, wherein in the combination status, a requested combination status is a status where a communication for the specific image processing has been requested for at least one apparatus of the one set of the image processing apparatuses and all the image processing apparatuses of the one set have not yet started the partial image processing of the specific image processing, wherein the displaying displays an executing image representing the executing combination status, the executing image being displayed in a distinguishable form from a requested image representing the requested combination status, and wherein when the status information comprises both information indicating that the one set of the image processing apparatuses is at the executing combination status and information relating to an execution instructing apparatus that has requested the at least one apparatus of the one set of the image processing apparatuses to execute the partial image processing, the displaying displays the status image, which represents an image representing the execution instructing apparatus and an image representing the one set of the image processing apparatuses with associated to each other.

2. The non-transitory computer-readable medium according to claim 1, wherein the plurality of image processing apparatuses comprises a first image processing apparatus, a second image processing apparatus, a third image processing apparatus and a fourth image processing apparatus, wherein the first image processing apparatus and the second image processing apparatus configure a first set of the image processing apparatuses, wherein the third image processing apparatus and the fourth image processing apparatus configure a second set of the image processing apparatuses, wherein when the combination status of the first set of the image processing apparatuses is the executing combination status and the combination status of the second set of the image processing apparatuses is the requested combination status, and wherein when the status information comprises both information indicating that the combination status of the first set of the image processing apparatuses is the executing combination status and information indicating that the combination status of the second set of the image processing apparatuses is the requested combination status, the displaying displays the status image, which comprises the executing image representing the combination status of the first set of the image processing apparatuses and the requested image representing the combination status of the second set of the image processing apparatuses, the requested image being displayed in a distinguishable form from the executing image.

3. The non-transitory computer-readable medium according to claim 1, the instruction further controlling the processor to execute:

receiving a user instruction of designating the specific image processing, wherein the displaying displays the status image, which represents a status of the image processing apparatus included in the plurality of image processing apparatuses capable of executing any one of the plurality of partial image processing constituting the specific image processing designated by the user instruction.

4. The non-transitory computer-readable medium according to claim 1, wherein the displaying displays the status image comprising, as the executing image, both a post-start image representing the image processing apparatus having started execution of the partial image processing of the specific image processing and a pre-start image representing the image processing apparatus having not yet started execution of the partial image processing of the specific image processing, the pre-start image being displayed in a distinguishable form from the post-start image.

5. The non-transitory computer-readable medium according to claim 1, wherein when the status information comprises information associated with a released apparatus that is an image processing apparatus of which a number of communication sessions established for image processing when acquiring the status information is zero, the displaying displays the status image, which comprises a released image representing the released apparatus, in a distinguishable form from both of the executing image and the requested image.

6. The non-transitory computer-readable medium according to claim 1, wherein when the status information comprises position information, which is information relating to each position of the plurality of image processing apparatuses, the displaying displays the status image, which indicates the position of at least a part of the plurality of image processing apparatuses.

7. The non-transitory computer-readable medium according to claim 1, wherein when the status information comprises queuing job count information related to a queuing job count, which is a number of requested and non-completed image processing, the displaying displays the status image, which comprises at least one of a more queuing job image, which is an image representing an image processing apparatus of which the queuing job count is a threshold or more, and a less queuing job image, which is an image representing an image processing apparatus of which the queuing job count is less than the threshold, the less queuing job image being displayed in a distinguishable form from the more queuing job image.

8. The non-transitory computer-readable medium according to claim 1, wherein when the status information comprises group information indicating a group selected from a plurality of groups comprising a first group and a second group as groups to which the image processing apparatuses belong, the displaying displays the status image, which comprises a first group image, which is an image representing the image processing apparatus belonging to the first group, and a second group image, which is an image representing the image processing apparatus belonging to the second group, the second group image being displayed in a distinguishable form from the first group image.

9. A data processing apparatus comprising:
a network interface for connection to a network;
a display device for displaying an image;
memory storing instructions;
a processor that, when executing the instructions, executes:
acquiring status information related to a status of at least one image processing apparatus, the at least one image processing apparatus being included in a plurality of image processing apparatuses connected to the network; and
displaying a status image, which is an image representing the status of the image processing apparatus associated with the acquired status information, on the display device,
wherein a combination status is status being related to one set of image processing apparatuses, each of which executes each of a plurality of partial image processing constituting specific image processing, of the plurality of image processing apparatuses,
wherein in the combination status, an executing combination status is a status where at least one apparatus of the one set of the image processing apparatuses is executing the partial image processing of the specific image processing,
wherein in the combination status, a requested combination status is a status where a communication for the specific image processing has been requested for at least one apparatus of the one set of the image processing apparatuses and all the image processing apparatuses of the one set have not yet started the partial image processing of the specific image processing,
wherein the displaying displays an executing image representing the executing combination status, the executing image being displayed in a distinguishable form from a requested image representing the requested combination status,
wherein the plurality of image processing apparatuses comprises a first
image processing apparatus, a second image processing apparatus, a third image processing apparatus and a fourth image processing apparatus,
wherein the first image processing apparatus and the second image processing apparatus configure a first set of the image processing apparatuses,
wherein the third image processing apparatus and the fourth image processing apparatus configure a second set of the image processing apparatuses,
wherein when the combination status of the first set of the image processing apparatuses is the executing combination status and the combination status of the second set of the image processing apparatuses is the requested combination status, and wherein when the status information comprises both information indicating that the combination status of the first set of the image processing apparatuses is the executing combination status and information indicating that the combination status of the second set of the image processing apparatuses is the requested combination status,
the displaying displays the status image, which comprises the executing image representing the combination status of the first set of the image processing apparatuses and the requested image representing the combination status of the second set of the image processing apparatuses, the requested image being displayed in a distinguishable form from the executing image.

10. A data processing apparatus comprising:
a network interface for connection to a network;
a display;
memory storing instructions;
a processor that, when executing the instructions, executes:
receiving a user's input indicating that a copying process is requested;
acquiring, via the network interface, first status information related to a status of a scanner, the scanner being connected to the network;
acquiring, via the network interface, second status information related to a status of a printer, the printer being connected to the network;
generating a first image indicating the status of the scanner based on the first status information;
generating a second image indicating a status of the printer based on the second status information;
displaying the first image and the second image on the display; wherein the first status information indicates that the scanner is being used, the first image is displayed on the display in a first format, the second status information indicates that the printer is reserved for printing, and the second image is displayed on the display in a second format different from the first format, while the scanner executes a scanning process as a part of the copying process, and
wherein the second status information indicates that the printer is being used, and the second image is displayed on the display in the first format, while the printer executes a printing process as a part of the copying process.

* * * * *